US008788120B1

(12) United States Patent
Imbrie et al.

(10) Patent No.: US 8,788,120 B1
(45) Date of Patent: Jul. 22, 2014

(54) TARGETING MANAGEMENT

(75) Inventors: Andrew P. Imbrie, Santa Clara, CA (US); Steven A. Dunn, Livermore, CA (US); Andrew A. Myers, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 592 days.

(21) Appl. No.: 13/090,175

(22) Filed: Apr. 19, 2011

(51) Int. Cl.
 *G06F 19/00* (2011.01)
(52) U.S. Cl.
 USPC ........ 701/3; 89/1.8; 244/3.1; 342/62; 342/65; 235/404; 235/411; 235/412; 235/416
(58) Field of Classification Search
 USPC ........ 89/1.8, 1.11; 244/3.15, 3.2, 3.21, 158.4, 244/158.6; 342/62, 65; 235/400, 404, 411, 235/412, 416; 701/3, 16
 See application file for complete search history.

(56) References Cited

U.S. PATENT DOCUMENTS

| | | | |
|---|---|---|---|
| 5,367,458 A | 11/1994 | Roberts et al. | |
| 6,508,435 B1 * | 1/2003 | Karpov et al. | 244/2 |
| 6,796,213 B1 * | 9/2004 | McKendree et al. | 89/1.11 |
| 6,896,220 B2 * | 5/2005 | McKendree et al. | 244/3.15 |
| 7,207,517 B2 * | 4/2007 | McKendree et al. | 244/3.15 |
| 7,335,887 B1 | 2/2008 | Verbinski et al. | |
| 7,367,525 B2 * | 5/2008 | McKendree et al. | 244/3.15 |
| 2010/0017126 A1 | 1/2010 | Holcman et al. | |
| 2010/0198474 A1 | 8/2010 | Shiiba et al. | |
| 2013/0006480 A1 | 1/2013 | Osanai | |

* cited by examiner

*Primary Examiner* — Thomas Black
*Assistant Examiner* — Peter D Nolan
(74) *Attorney, Agent, or Firm* — McDermott Will & Emery LLP

(57) ABSTRACT

System and methods for managing targets of a vehicle is provided. In some aspects, a system may include a boundary check module configured to receive boundary information from a flight safety system. The boundary information comprises a selected termination boundary of a plurality of termination boundaries confining navigation of the vehicle. Each of the plurality of termination boundaries is associated with a target of a plurality of targets of the vehicle. The system may further include a target modification module configured to select the target associated with the selected termination boundary, and a target guidance module configured to provide the selected target to a guidance and control system of the vehicle.

19 Claims, 21 Drawing Sheets

1700-A

```
                    ┌─────────┐
                    │  Start  │
                    └─────────┘
                         │
                         ▼
┌─────────────────────────────────────────────────────────────┐
│ receiving boundary information from a flight safety system,  │
│ the boundary information comprising a selected termination   │
│ boundary of a plurality of termination boundaries confining  │
│ navigation of the vehicle, wherein each of the plurality of  │
│ termination boundaries is associated with a target of a      │
│ plurality of targets of the vehicle                          │
│ 1702-A                                                        │
└─────────────────────────────────────────────────────────────┘
                         │
                         ▼
┌─────────────────────────────────────────────────────────────┐
│ selecting the target associated with the selected            │
│ termination boundary                                         │
│ 1704-A                                                        │
└─────────────────────────────────────────────────────────────┘
                         │
                         ▼
┌─────────────────────────────────────────────────────────────┐
│ providing the selected target to a guidance and control      │
│ system of the vehicle                                        │
│ 1706-A                                                        │
└─────────────────────────────────────────────────────────────┘
                         │
                         ▼
                    ┌─────────┐
                    │   End   │
                    └─────────┘
```

FIG. 17A

TARGETING MANAGEMENT

STATEMENT AS TO RIGHTS TO INVENTIONS MADE UNDER FEDERALLY SPONSORED RESEARCH OR DEVELOPMENT

The U.S. Government has a paid-up license in this invention and the right in limited circumstances to require the patent owner to license others on reasonable terms as provided for by the terms of contract no. FA8814-08-C-0003 awarded by the United States Air Force.

FIELD

The present invention generally relates to targeting systems and, in particular, relates to systems and methods for managing targets of a vehicle.

BACKGROUND

Population centers, mission personnel, and equipment may be endangered if flight vehicles fly off-course. To address this, many flight vehicles are equipped with flight safety systems that terminate flight when these vehicles fly off-course. The flight safety systems, however, can be costly in terms of flight hardware, personnel, and range assets for tracking and communicating with the flight vehicles. Furthermore, recent expansion of vehicle flight envelopes may exacerbate the issue of tracking a particular vehicle when it has the capability of flying on its own over large areas. Providing sufficient numbers of range assets along the flight path has become challenging, if not prohibitive from cost and availability standpoints.

Although autonomous flight safety systems may be used, the volume of flight hardware associated with such systems can be prohibitive from a weight, packaging, and cost standpoint. Furthermore, accommodating anomalous navigation failures is a challenge for autonomous flight safety systems. For example, in order for an autonomous flight safety system to operate and terminate a flight of a vehicle if the vehicle is flying off-course, the position of the vehicle needs to be known. Identifying the position of the vehicle is the function of a navigation system of the vehicle. However, when the navigation system is not functioning properly (e.g., is anomalous), the vehicle's position cannot be measured. Sensors off-board the vehicle may be employed to mitigate this risk, but these sensors can add complexity and cost.

Further, when the navigation system is not functioning properly, autonomous flight safety systems may terminate a flight prior to reaching an intended target. Terminating the flight prior to reaching the intended target jeopardizes mission success because mission objectives are typically configured to execute only at the intended target.

SUMMARY

According to various aspects of the subject technology, an autonomous flight safety system is provided that solves some or all of the foregoing problems. In some aspects, the system may meet stringent land impact test range requirements, and utilize hardware that may already be part of a flight vehicle's basic mission navigation, guidance, and control (NG&C) functions, thereby minimizing the need to use additional hardware. The system may provide tracking solutions for full range and reduced range requirements. In particular, the system may be beneficially suited for long range flights where continuous range asset coverage is infeasible and where global positioning system (GPS) may be limited or intermittent. According to various aspects of the subject technology, a targeting system is provided that solves some or all of the foregoing problems. In some aspects, the system may increase mission success for a vehicle equipped with an autonomous flight safety system by managing a set of alternate targets for executing mission objectives. The system may be configured to execute one of a plurality of mission objectives based on the selected target, thereby enabling the vehicle to execute target specific mission objectives while increasing mission success for the vehicle.

According to various aspects of the subject technology, a system for managing boundaries of a vehicle being guided toward a target is provided. The system comprises a first gate module configured to receive primary positional information of the vehicle and secondary positional information of the vehicle, to compare the primary positional information with the secondary positional information, and to generate a first pass indicator or a first fail indicator based on the comparison. The system also comprises a first boundary module configured to confine navigation of the vehicle to within one of a plurality of termination boundaries based on which of the first pass indicator and the first fail indicator is generated. Each of the plurality of termination boundaries is confined within a range boundary of the vehicle and offset from the range boundary at a different magnitude.

According to various aspects of the subject technology, a method for managing boundaries of a vehicle being guided toward a target is provided. The method comprises: receiving primary positional information of the vehicle and secondary positional information of the vehicle; comparing the primary positional information with the secondary positional information; generating a first pass indicator or a first fail indicator based on the comparing; and confining navigation of the vehicle to within one of a plurality of termination boundaries based on which of the first pass indicator and the first fail indicator is generated. Each of the plurality of termination boundaries is confined within a range boundary of the vehicle and offset from the range boundary at a different magnitude.

According to various aspects of the subject technology, a machine-readable storage medium encoded with instructions executable by a processing system is provided to perform a method for managing boundaries of a vehicle being guided toward a target. The instructions comprise code for: receiving primary positional information of the vehicle and secondary positional information of the vehicle; comparing the primary positional information with the secondary positional information; generating a first pass indicator or a first fail indicator based on the comparing; and confining navigation of the vehicle to within one of a plurality of termination boundaries based on which of the first pass indicator and the first fail indicator is generated. Each of the plurality of termination boundaries is confined within a range boundary of the vehicle and offset from the range boundary at a different magnitude.

According to various aspects of the subject technology, a system for managing targets of a vehicle is provided. The system comprises a boundary check module configured to receive boundary information from a flight safety system. The boundary information comprises a selected termination boundary of a plurality of termination boundaries confining navigation of the vehicle. Each of the plurality of termination boundaries is associated with a target of a plurality of targets of the vehicle. The system also comprises a target modification module configured to select the target associated with the selected termination boundary, and a target guidance module configured to provide the selected target to a guidance and control system of the vehicle.

According to various aspects of the subject technology, a method for managing targets of a vehicle is provided. The method comprises receiving boundary information from a flight safety system. The boundary information comprises a selected termination boundary of a plurality of termination boundaries confining navigation of the vehicle. Each of the plurality of termination boundaries is associated with a target of a plurality of targets of the vehicle. The method further comprises selecting the target associated with the selected termination boundary, and providing the selected target to a guidance and control system of the vehicle.

According to various aspects of the subject technology, a machine-readable storage medium encoded with instructions executable by a processing system is provided to perform a method for managing targets of a vehicle is provided. The instructions comprise code for receiving boundary information from a flight safety system. The boundary information comprising a selected termination boundary of a plurality of termination boundaries confining navigation of the vehicle. Each of the plurality of termination boundaries is associated with a target of a plurality of targets of the vehicle. The instructions further comprise code for selecting the target associated with the selected termination boundary, and providing the selected target to a guidance and control system of the vehicle.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

FIG. 17A illustrates an example of a method for managing targets of a vehicle, in accordance with various aspects of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

Vehicle Boundary Management

Figure 1:
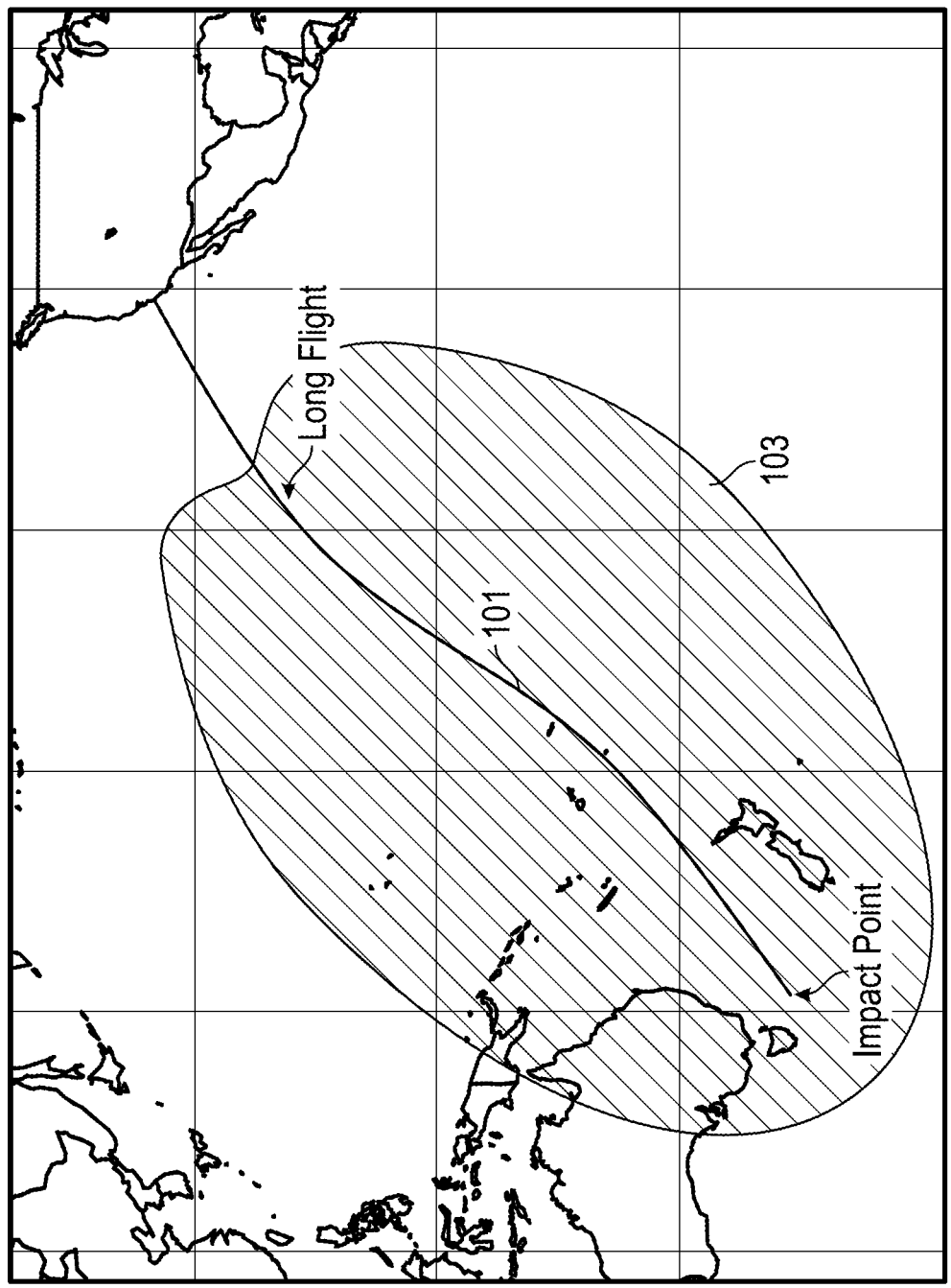
FIG. 1 illustrates an example of a flight path of a vehicle, and the associated flight envelope of the vehicle.

FIG. 1 illustrates an example of a flight path 101 of a vehicle, and the associated flight envelope 103 of the vehicle. The flight envelope 103 of the vehicle illustrates a possible area within which the vehicle may make contact with the surface of the Earth should the vehicle fly off-course from flight path 101. As shown, the vehicle has a large dispersion flight envelope 103, which may be typical of many high capability vehicles engaging in a long flight. These vehicles, for example, may be projectiles (e.g., missiles), aircraft, or spacecraft (e.g., reentry vehicles). Because of the large dispersion envelope 103, a flight safety system may be implemented to ensure that the vehicle does not make contact with the surface of the Earth within undesired areas such as population centers.

Figure 2:
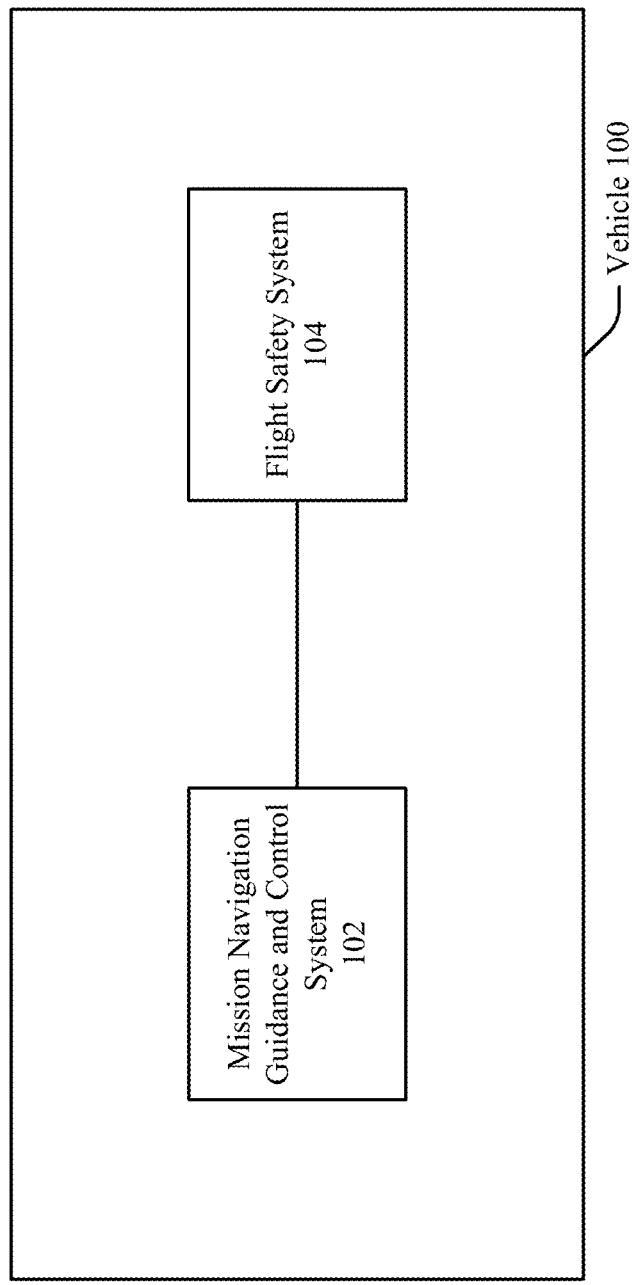
FIG. 2 illustrates a simplified block diagram of a vehicle equipped with a mission navigation guidance and control system and a flight safety system, in accordance with various aspects of the subject technology.

FIG. 2 illustrates a simplified block diagram of vehicle 100 equipped with mission navigation guidance and control system 102 and flight safety system 104, in accordance with various aspects of the subject technology. Mission navigation guidance and control system 102 may be used to guide vehicle 100 toward its intended target. In some aspects, flight safety system 104 may ensure that vehicle 100 does not fly off-course. Otherwise, flight safety system 104 may terminate the flight of vehicle 100. For example, flight safety system 104 may be used for managing boundaries of vehicle 100 to ensure that vehicle 100 does not cross any of the boundaries when being guided toward the target. If so, flight safety system 104 may terminate the flight of vehicle 100. In some aspects, flight safety system 104 provides autonomous tracking that is separate from mission navigation guidance and control system 102. In some aspects, flight safety system 104 may sometimes be referred to as a flight safety passenger navigation system. In some aspects, flight safety system 104 may provide tracking solutions with a level of independence from mission navigation guidance and control system 102.

Figure 3:
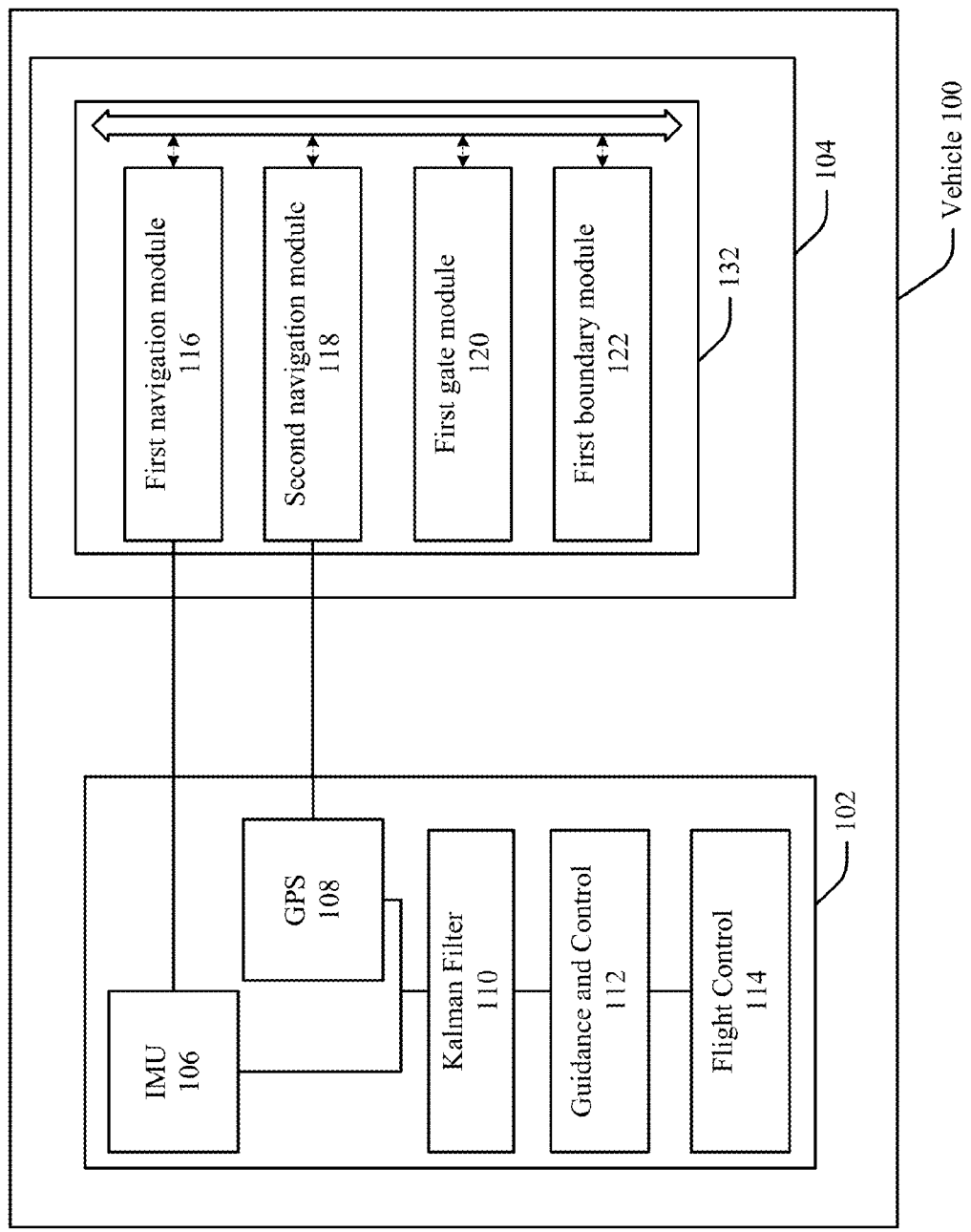
FIG. 3 illustrates a detailed block diagram of a vehicle, in accordance with various aspects of the subject technology.

FIG. 3 illustrates a detailed block diagram of vehicle 100, in accordance with various aspects of the subject technology. Mission navigation guidance and control system 102 comprises inertial measurement unit (IMU) 106 and global positioning system (GPS) 108, both of which are examples of navigation units that may be on-board vehicle 100. However, other suitable navigation units may also be used. Mission navigation guidance and control system 102 also comprises Kalman filter 110, guidance and control module 112, and flight control module 114. IMU 106 and GPS 108 provide vehicle information of vehicle 100 to Kalman filter 110, which blends the vehicle information from IMU 106 and GPS 108 and determines the most reliable navigational state of vehicle 100. Based on the navigational state of vehicle 100, guidance and control module 112 determines how to guide vehicle 100 toward the intended target. This information is conveyed to flight control module 114, which may act to control actuators and other suitable vehicle components to guide the vehicle 100 to the intended target. For example, flight control module 114 may control one or more flight control surfaces of vehicle 100 to guide vehicle 100 to the intended target.

Flight safety system 104 comprises first boundary management module 132. First boundary management module 132 comprises first navigation module 116, second navigation module 118, first gate module 120, and first boundary module 122. These modules (e.g., 116, 118, 120, 122) may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 4:
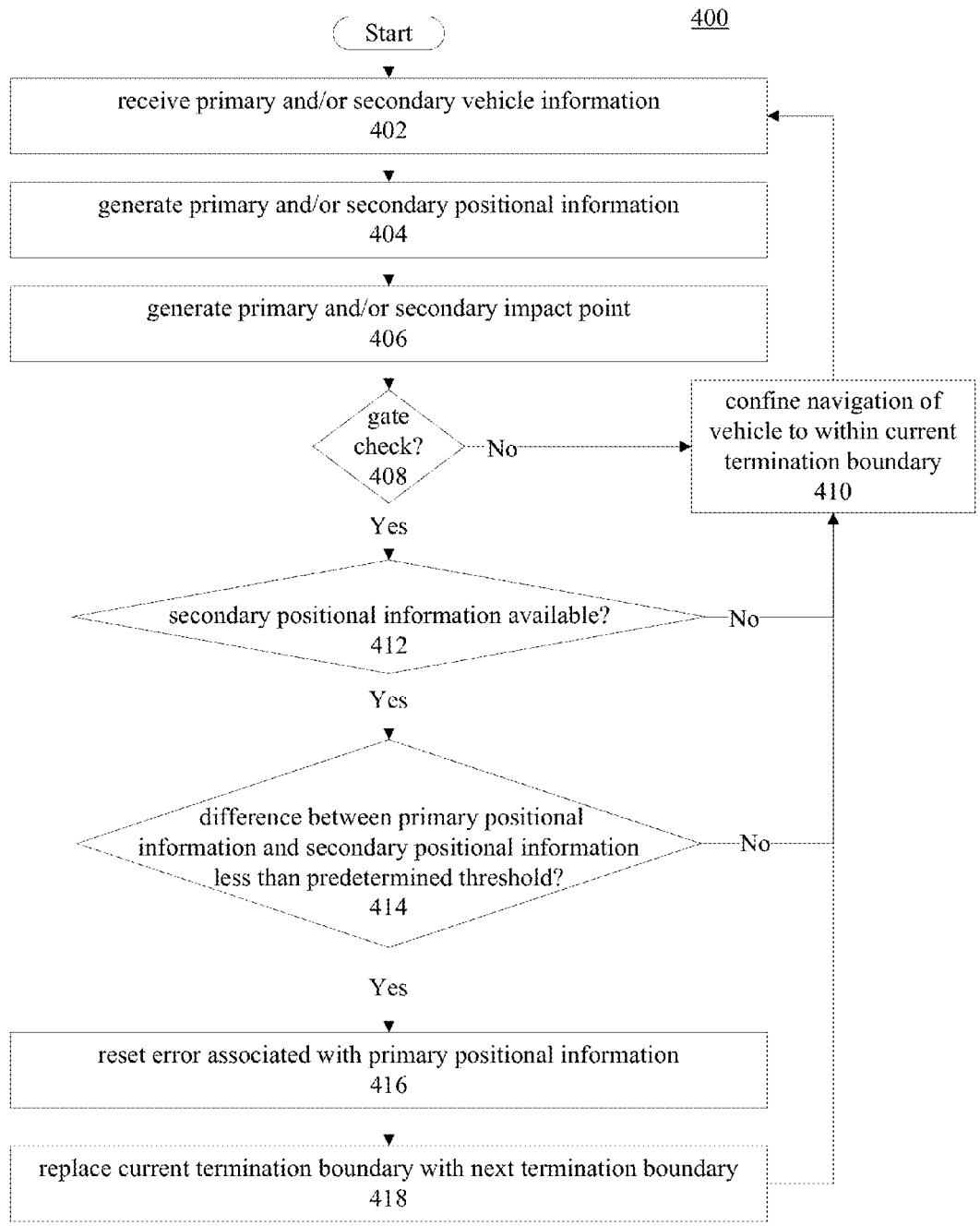
FIG. 4 illustrates an example of a method for managing boundaries of a vehicle being guided toward a target, in accordance with various aspects of the subject technology.

FIG. 4 illustrates an example of method 400 for managing boundaries of vehicle 100 being guided toward a target, in accordance with various aspects of the subject technology. Method 400 may be implemented, for example, by first boundary management module 132. Method 400 comprises receiving primary and/or secondary vehicle information (402). The primary vehicle information may be vehicle information from IMU 106, while the secondary vehicle information may be vehicle information from GPS 108. Thus, two separate sources are used to obtain vehicle information of vehicle 100. This is because while IMUs are affordable and packageable, they do not always provide the accuracy needed for confining long range flights into reasonably confined test range areas. GPSs may provide better accuracy, but as GPS coverage may be intermittent due to vehicle dynamics and hypersonic plasma effects, GPS 108 alone may not be able to provide 100% tracking coverage. Thus, IMU 106 and GPS 108 may be used together to reliably obtain vehicle information of vehicle 100. Aspects of the subject technology may take advantage of the high reliability and fully continuous nature of IMU 106 in addition to the high accuracy of GPS 108.

In some aspects, GPS 108 may be used to augment IMU 106. Because GPS coverage may be intermittent, the vehicle information from IMU 106 may be considered to be the primary vehicle information, while the vehicle information from GPS 108 may be considered to be the secondary vehicle information. In some aspects, first navigation module 116 may receive the primary vehicle information from IMU 106. In some aspects, second navigation module 118 may receive the secondary vehicle information from GPS 108, for example, if the secondary vehicle information is available (e.g., GPS coverage is provided).

Method 400 also comprises generating primary and/or secondary positional information of vehicle 100 (404). In some aspects, first navigation module 116 may generate the primary positional information based on the primary vehicle information. For example, because the primary vehicle information is from IMU 106, the primary vehicle information may comprise at least one of a rate (e.g., an angular rate) and an acceleration (e.g., a linear acceleration) of vehicle 100. In this regard, the primary positional information can be generated, for example, by integrating rate over time to determine an attitude of vehicle 100. In another example, the primary positional information can be generated by integrating acceleration over time to determine a velocity of vehicle 100. Thus, the primary positional information generated by first navigation module 116 may comprise at least one of a position, a velocity, and an attitude of vehicle 100.

In some aspects, second navigation module 118 may generate the secondary positional information based on the secondary vehicle information (e.g., if the secondary vehicle information is available). Because the second navigation unit on-board vehicle 100 is GPS 108, the secondary vehicle information from GPS 108 already comprises secondary positional information (e.g., at least one of a position, a velocity, and a time of vehicle 100). Thus, the secondary positional information generated by second navigation module 118 may simply be the same as the secondary vehicle information, and no calculations may be needed to generate the secondary positional information. However, if the second navigation unit is not a GPS but rather some other suitable navigation unit that is more accurate than an IMU, but provides secondary vehicle information that is not the same as secondary positional information, then second navigation module 118 may generate the secondary positional information based on the secondary vehicle information provided by the second navigation unit by implementing one or more calculations.

Method 400 also comprises generating primary and/or secondary impact points of vehicle 100 (406). In some aspects, the impact points may sometimes be referred to as instantaneous impact points (IIPs). In some aspects, the impact points are projected points at which vehicle 100 may make possible contact with the surface of the Earth (e.g., if the flight of vehicle 100 should somehow terminate and/or fly off-course). In some aspects, the surface of the Earth may include land, bodies of water, objects on land (e.g., buildings), or objects on the bodies of water (e.g., bridges, piers, boats, etc.). First navigation module 116 may determine the primary impact point of vehicle 100 based on the primary positional information. For example, first navigation module 116 may identify the position of vehicle 100 and continuously propagate the position of vehicle 100 to the surface of the Earth to determine its primary impact point. If the secondary positional information is available, second navigation module 118 may determine the secondary impact point of vehicle 100 in a similar manner as first navigation module 116, but the secondary impact point would be determined based on the secondary positional information. Thus, two independently generated impact points may be generated, one being generated based on information from IMU 106 (e.g., the primary impact point) and the other being generated based on information from GPS 108 (e.g., the secondary impact point). These points may be used to determine whether vehicle 100 is flying off-course (e.g., the primary impact point and/or the secondary impact point are beyond a certain boundary that vehicle 100 is prohibited from crossing).

Figure 5:
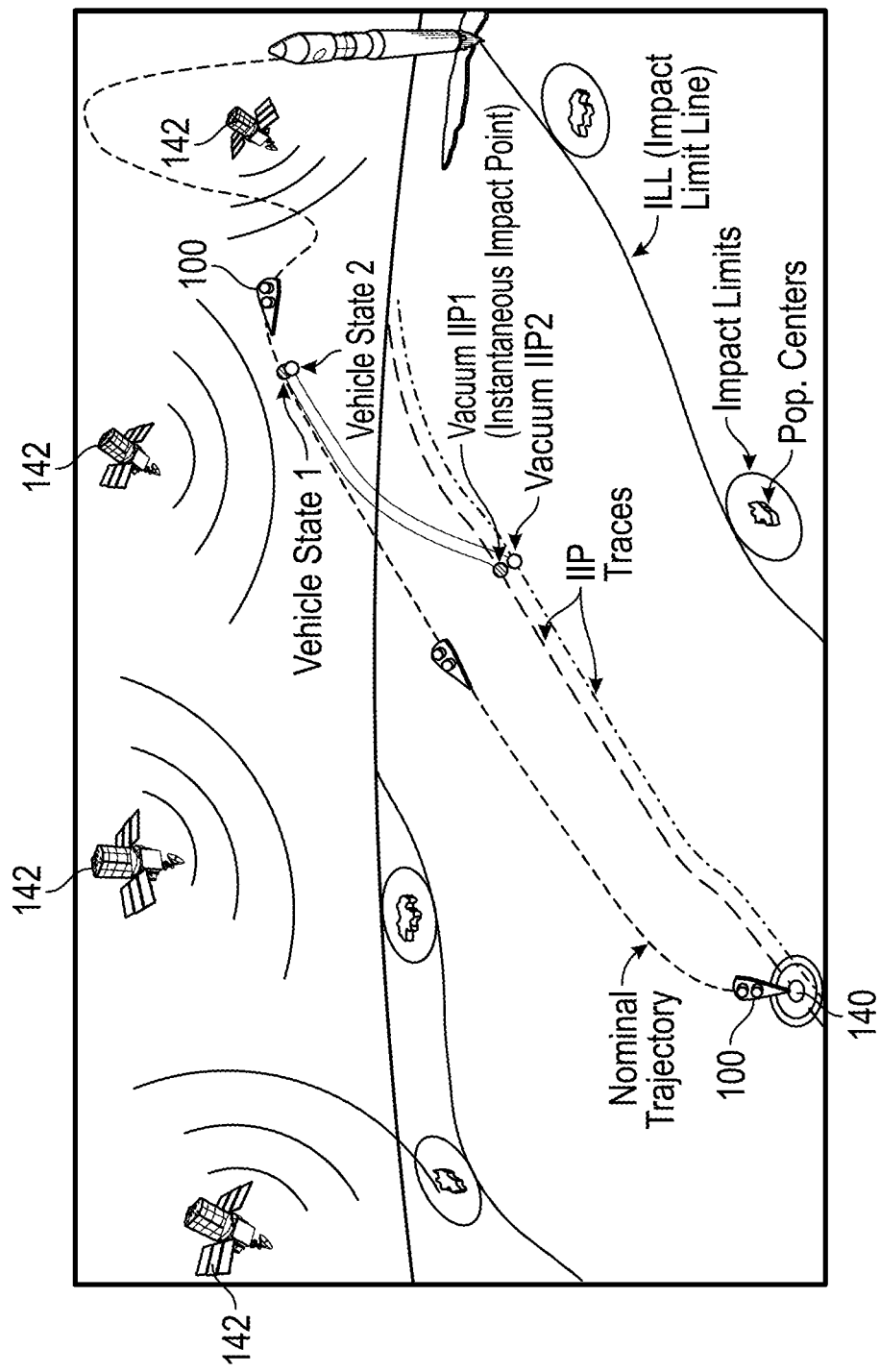
FIG. 5 illustrates an example of a trajectory and impact points of a vehicle, in accordance with various aspects of the subject technology.

FIG. 5 illustrates an example of a trajectory and impact points of vehicle 100, in accordance with various aspects of the subject technology. While vehicle 100 is traveling along its nominal trajectory toward target 140, first navigation module 116 may periodically generate the primary impact point and the second navigation module 118 may periodically generate the secondary impact point. For example, first navigation module 116 may generate the primary impact point (e.g., shown in FIG. 5 as Vacuum IIP 1) based on the primary positional information (e.g., the position and velocity of vehicle 100 at Vehicle State 1), while second navigation module 118 may generate the secondary impact point (e.g., shown in FIG. 5 as Vacuum IIP 2) based on the secondary positional information (e.g., the position and/or velocity of vehicle 100 at Vehicle State 2). These points may be used to determine whether vehicle 100 is flying off-course by comparing the points to a range boundary of vehicle 100 (e.g., referred to as an impact limit line in FIG. 5). In some aspects, the range boundary is a predetermined boundary that at least one of vehicle 100, an object from vehicle 100 (e.g., debris, cargo, or parts from vehicle 100), and a non-soundwave-based shockwave from vehicle 100 (e.g., an explosion) is prohibited from crossing. The range boundary may ensure that population centers are not endangered by vehicle 100 should vehicle 100 fly off-course and crash onto the surface of the Earth. In some aspects, the range boundary is a predetermined mission boundary that at least one of vehicle 100, an object from vehicle 100, and a non-soundwave-based shockwave from vehicle 100 is prohibited from crossing.

The ability to generate two independent impact points provides added reliability and is particularly useful in situations where one impact point cannot be generated (e.g., the secondary impact point cannot be generated because the GPS coverage provided by the one or more satellites 142 is intermittent). As shown in FIG. 5, the primary impact point and the secondary impact point are within the range boundary of vehicle 100. However, the example shown in FIG. 5 assumes that the primary impact point and the secondary impact point are generated without any errors, and hence these points are referred to as vacuum IIPs. But errors (e.g., tracking source errors) typically exist when generating positional information of vehicle 100, particularly when the positional information of vehicle 100 is generated based on vehicle information from IMUs. Indeed, the errors associated with IMUs typically grow larger with time. Thus, in order to provide insurance that that vehicle 100 does not cross the range boundary, errors should also be taken into account.

Figure 6:
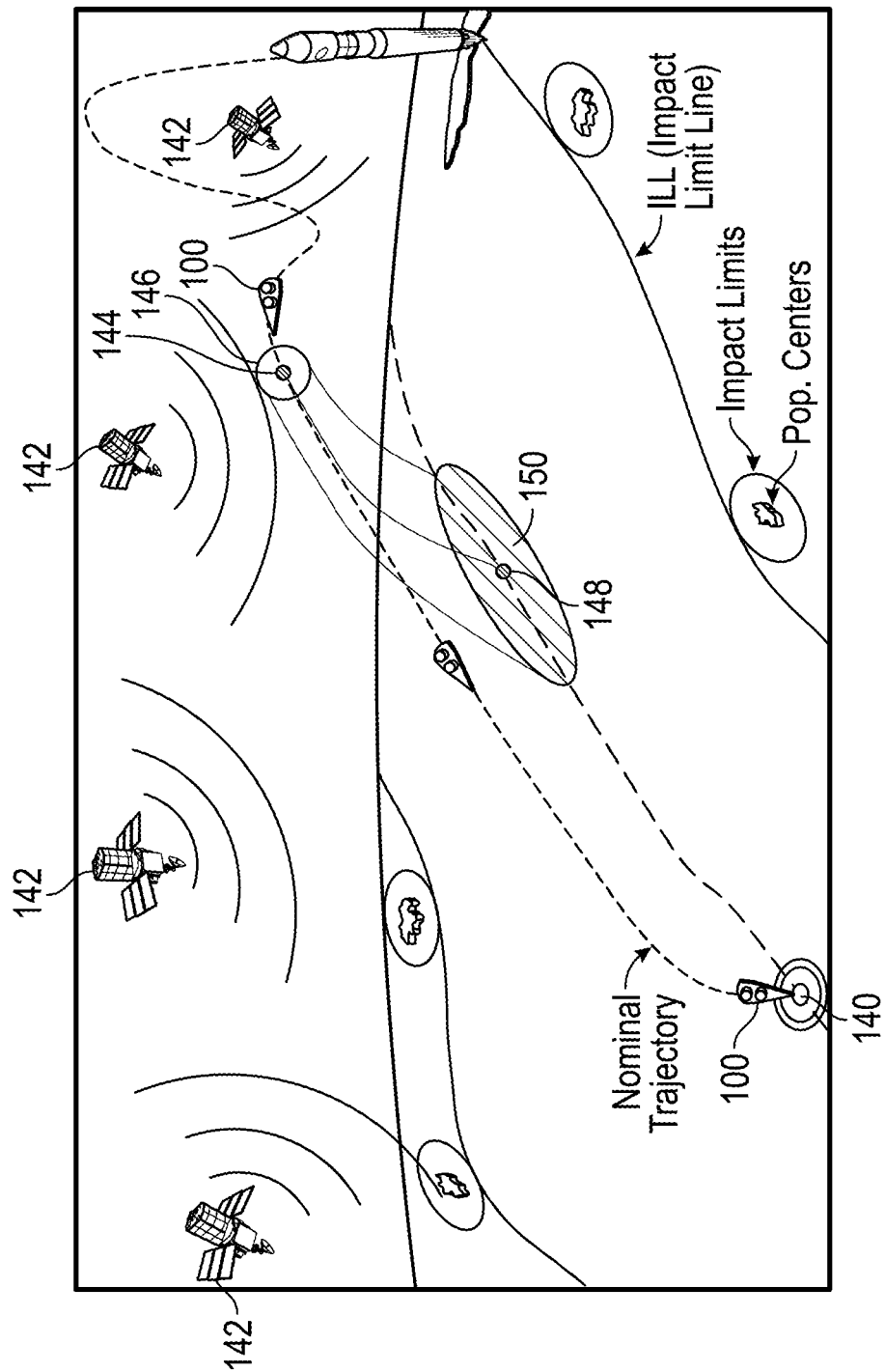
FIG. 6 illustrates an example of a trajectory of a vehicle while taking into account errors associated with tracking the vehicle, in accordance with various aspects of the subject technology.

FIG. 6 illustrates an example of a trajectory of vehicle 100 while taking into account errors associated with tracking vehicle 100, in accordance with various aspects of the subject technology. Point 144 represents the primary positional information of vehicle 100, while error zone 146 illustrates the amount of error that is associated with the primary positional information at point 144. Primary impact point 148 is generated based on the primary positional information at point 144. Because point 144 has an associated error zone 146, primary impact point 148 also has an associated error based at least in part on error zone 146. Error zone 150 illustrates the amount of error that is associated with primary impact point 148. As shown, both primary impact point 148 and its associated error zone 150 are within the range boundary of vehicle 100. In order to provide insurance that vehicle 100 does not cross the range boundary, both the primary impact point 148 and its associated error zone 150 should not cross the range boundary.

Figure 7:
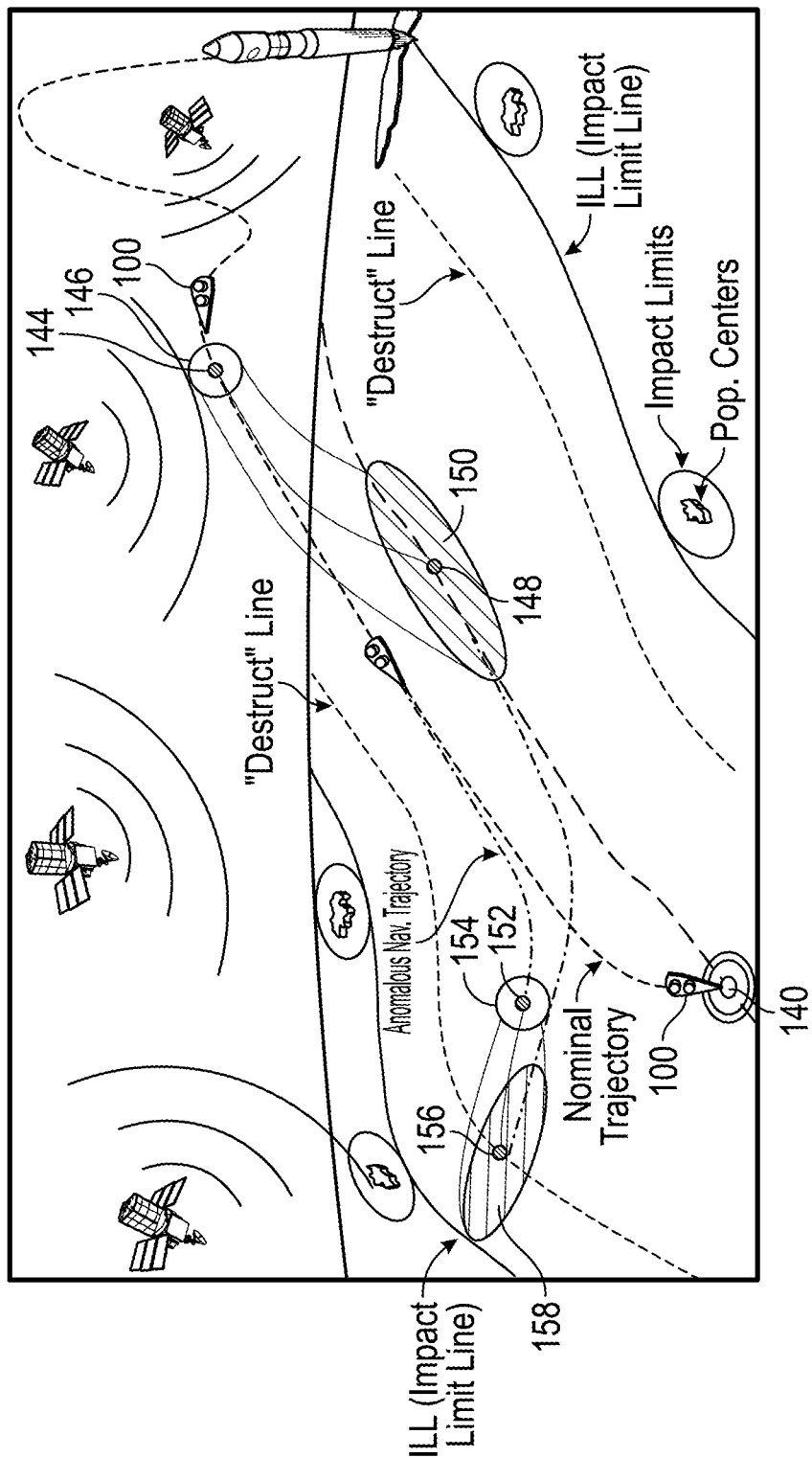
FIG. 7 illustrates an example of an anomalous trajectory of a vehicle, in accordance with various aspects of the subject technology.

FIG. 7 illustrates an example of an anomalous trajectory of vehicle 100, in accordance with various aspects of the subject technology. Vehicle 100 may fly off-course and travel along the anomalous navigational trajectory shown in FIG. 7. Point 152 represents the primary positional information of vehicle 100, while error zone 154 illustrates the amount of error that is associated with the primary positional information at point 154. Primary impact point 156 is generated based on the primary positional information at point 152. Error zone 158 illustrates the amount of error that is associated with primary impact point 156. Because both the primary impact point 156 and the error zone 158 should not cross the range boundary, a termination boundary is introduced (e.g., referred to in FIG. 7 as a "destruct" line). In some aspects, the termination boundary is a predetermined boundary that at least one of vehicle 100, an object from vehicle 100, and a non-soundwave-based shockwave from vehicle 100 is prohibited from crossing. The termination boundary is confined within the range boundary and offset from the range boundary. In some aspects, this offset may be based at least in part on an error level associated with the primary positional information. For example, the termination boundary is offset from the range boundary to ensure that error zone 158 associated with primary impact point 156 does not cross the range boundary. In some aspects, the offset may also be based in part on processing delays (e.g., delays in generating the positional information). In some aspects, the termination boundary is a boundary that an impact point (e.g., the primary impact point and/or the secondary impact point if available) is prohibited from crossing, while the range boundary is a boundary that both the impact point and the error zone associated with the impact point is prohibited from crossing.

Figure 8:
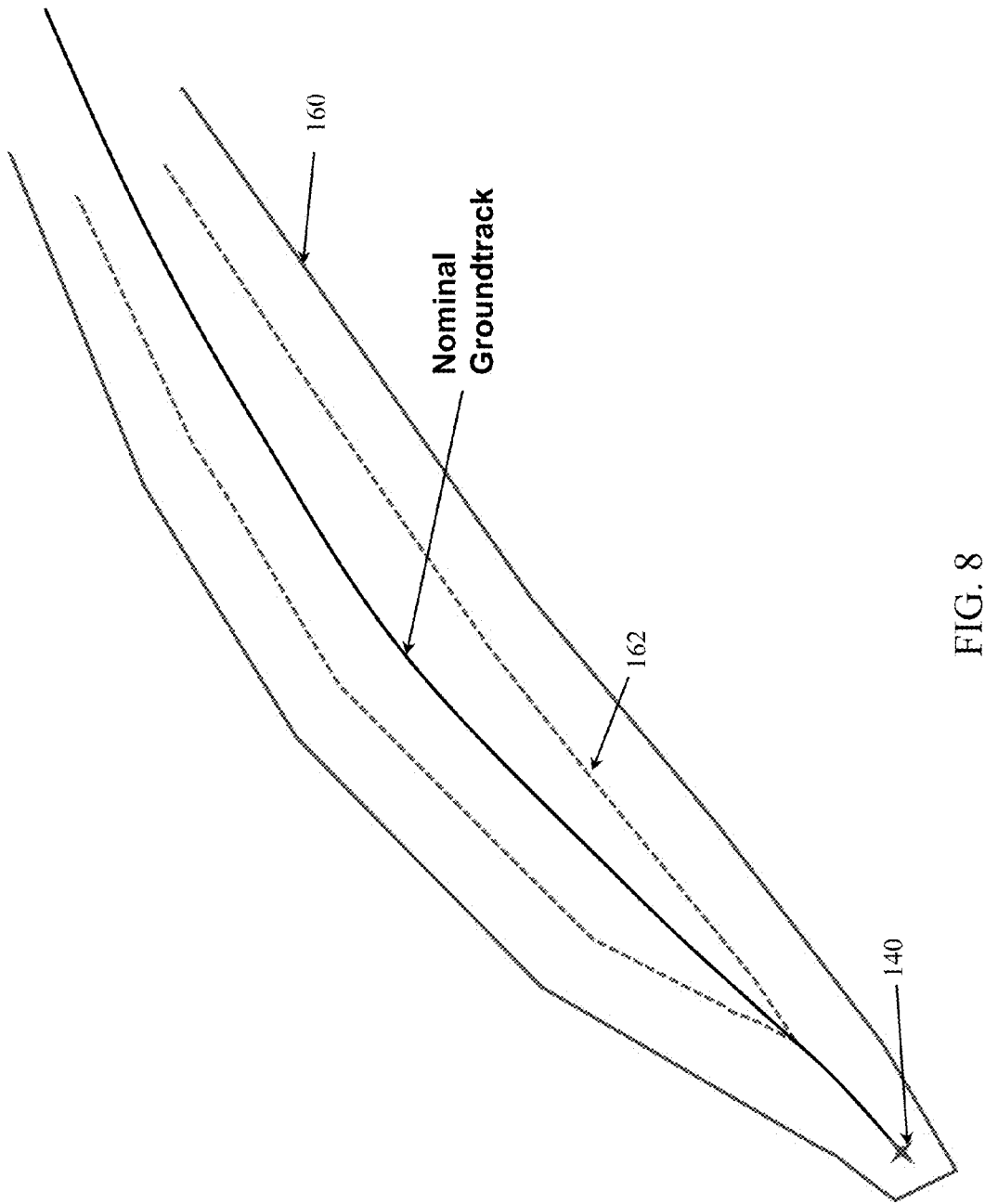
FIG. 8 illustrates an example of a groundtrack of a vehicle, in accordance with various aspects of the subject technology.

FIG. 8 illustrates an example of a groundtrack of vehicle 100, in accordance with various aspects of the subject technology. As shown, target 140 is within range boundary 160. However, since target 140 is relatively close to range boundary 160, a first termination boundary 162 closes vehicle 100 off from reaching target 140 because of its offset from range boundary 160. The offset effectively narrows the flight corridor of vehicle 100. Thus, if the tracking of vehicle 100 relies solely on vehicle information from IMU 106, the termination boundary being implemented (e.g., the first termination boundary 162) may be too restrictive because its offset needs to take into account the error associated with IMU 106, especially since the error associated with IMU 106 may grow larger with time.

According to various aspects of the subject technology, method 400 solves some or all of the foregoing problems by providing a way to reset the errors associated with IMU 106 based on GPS updates (e.g., updated positional information of vehicle 100 from GPS 108) and using a plurality of termination boundaries. According to certain aspects, a series of gates may be implemented, wherein at each gate, an error associated with IMU 106 may be checked for whether or not it can be reset based on a GPS update. Each time the error is reset, a new termination boundary with a smaller offset from the range boundary may be implemented. This progressive gated approach to managing termination boundaries of vehicle 100 may allow the flight corridor of vehicle 100 to be progressively increased until vehicle 100 is able to reach target 140. The progressive gated approach may allow IMU errors to be managed with GPS updates along the flight path of vehicle 100.

Figure 9:
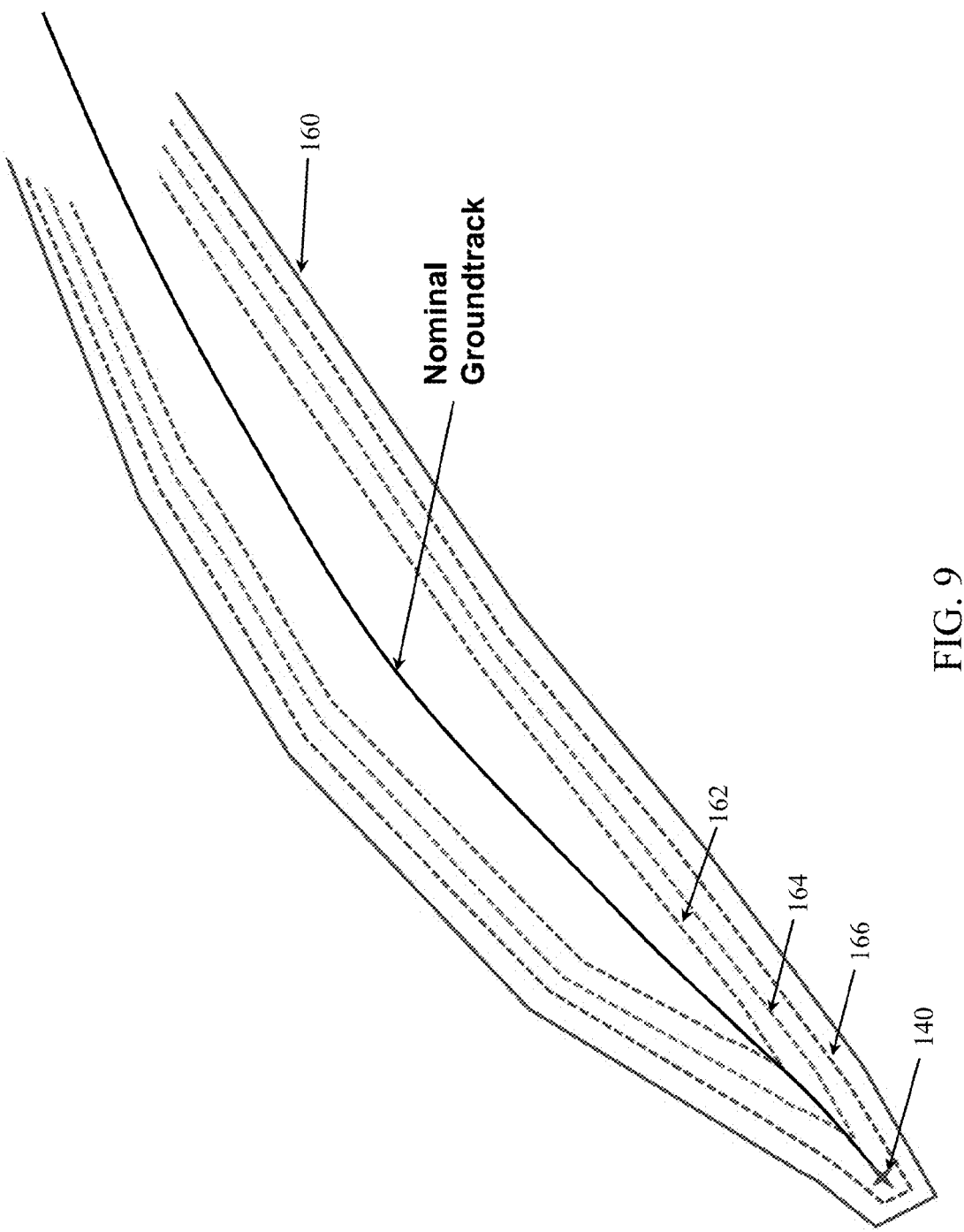
FIG. 9 illustrates an example of the groundtrack of a vehicle and the progressive gated approach being implemented to manage termination boundaries of the vehicle, in accordance with various aspects of the subject technology.

FIG. 9 illustrates an example of the groundtrack of vehicle 100 and the progressive gated approach being implemented to manage termination boundaries 162, 164, and 166 of vehicle 100, in accordance with various aspects of the subject technology. In some aspects, an initial gate prior to launch of vehicle 100 may be used to verify proper operation of all safety systems including GPS 108, IMU 106, and any computer and software as part of a launch commit criteria. Termination boundaries 162, 164, and 166 may be determined prior to launch of vehicle 100, with each of their offsets taking into account assumed GPS updates at various points along the flight path of vehicle 100. While the termination boundaries 162, 164, and 166 may define a flight corridor that may or may not be wide enough for vehicle 100 to reach target 140, vehicle 100 may be allowed to proceed along its flight with the expectation that GPS updates may be provided at various gate checks, thereby allowing any accumulated errors associated with IMU 106 to be reset and allowing a new termination boundary with a smaller offset to be implemented until vehicle 100 can reach target 140. For example, the first termination boundary 162 may be replaced by the second termination boundary 164, which may subsequently be replaced by the third termination boundary 166. The third termination boundary 166 has a large enough flight corridor to allow vehicle 100 to reach target 140. According to certain aspects, predetermined GPS update times and IMU error models may be established, exercised in Monte Carlo simulations, and approved by a test range to assure that probabilistic casualty requirements may be satisfied.

According to certain aspects, the gates may be implemented at various times during the flight of vehicle 100. In some aspects, more gates may be implemented at times when higher reliability is desired, when errors are large, when vehicle 100 is proceeding relatively close to population centers, when vehicle 100 is being launched, or at other suitable times that are appropriate for resetting the error level associated with IMU 106 to lower levels.

Returning to FIG. 4, gate checks may be monitored throughout the flight of vehicle 100. According to 408 and 410, if no gate check is being implemented, then navigation of vehicle 100 is confined to within a current termination boundary. According to certain aspects, prior to implementation of method 400, the current termination boundary may be initiated to be the first termination boundary of a plurality of termination boundaries. In some aspects, the first termination boundary may be a termination boundary that has the largest offset from range boundary 160 (e.g., first termination boundary 162).

In some aspects, first boundary module 122 may confine navigation of vehicle 100 to within the currently termination boundary by comparing the primary impact point and/or the secondary impact point to the current termination boundary. If the primary impact point and/or the secondary impact point does not exceed the current termination boundary, then vehicle 100 is allowed to proceed with its flight. If the primary impact point and/or the secondary impact point exceeds the current termination boundary, then first boundary module 122 may generate a termination indicator. The termination indicator may be a signal that instructs vehicle 100 to terminate its flight.

According to certain aspects, various suitable flight termination mechanisms may be utilized to terminate the flight of vehicle 100. For example, if the power for mission navigation guidance and control system 102 fails, an active flight termination mechanism that monitors the system health of mission navigation guidance and control system 102 may be activated. In some aspects, a passive flight termination mechanism may be used. This passive flight termination mechanism may utilize low vehicle aerodynamic stability to cause a cessation of trimmed gliding flight in the absence of active control for ending the flight. In some aspects, the active or passive flight termination may provide necessary fault tolerance for the implementation of method 400. In some aspects, operator input may be utilized to terminate the flight of vehicle 100.

According to 408 and 412, if a gate check is being implemented, then first gate module 120 may determine if the secondary positional information is available. The secondary positional information, for example, may be available if GPS coverage is provided and thus, second navigation module 118 is able to receive secondary vehicle information from GPS 108. As discussed above, the secondary vehicle information from GPS 108 may be the same as the secondary positional information. According to 412 and 410, if the secondary positional information is not available, then navigation of vehicle 100 is confined to within the current termination boundary.

According to 412 and 414, if the secondary positional information is available, then first gate module 120 is configured to determine a difference between the primary positional information and the secondary positional information. This difference may reflect an error level associated with IMU 106. Because the secondary positional information from GPS 108 may be more accurate than the primary positional information generated from IMU 106, then a large difference between the primary positional information and the secondary positional information may indicate that the primary positional information is not very accurate (e.g., a large error). First gate module 120 is configured to compare the difference to a predetermined threshold. In some aspects, the predetermined threshold may be set in an initialization process prior to implementation of method 400. The predetermined threshold may indicate an upper limit that the difference between the primary positional information and the secondary positional information may be. If the difference meets the threshold or exceeds it, then the error associated with the primary positional information may be considered too large to allow the error to be reset. Thus, the error is maintained and first gate module 120 may generate a fail indicator (e.g., represented by the "No" from 414), and navigation of vehicle 100 is confined to within the current termination boundary. As long as the difference between the primary positional information and the secondary positional information remains greater than or equal to the predetermined threshold, the current termination boundary will not be replaced with a termination boundary having a smaller offset. Thus, navigation of vehicle 100 will only be limited to the current termination boundary.

According to certain aspects, if the difference between the primary positional information and the secondary positional information is less than the predetermined threshold, then first gate module 120 may generate a pass indicator (e.g., represented by the "Yes" from 414). According to 416, first gate module 120 may reset the error level associated with the primary positional information if the first pass indicator is generated. In some aspects, the error level may be reset based on the secondary positional information. For example, the error level associated with the primary positional information may be reset such that the primary positional information matches the secondary positional information. In some aspects, the error level may be reset to a lower level such that a smaller offset may be used for a next termination boundary to be implemented. In some aspects, the error level may be reset to zero.

After the error level is reset, first boundary module 122 may replace the current termination boundary with a next termination boundary having a smaller offset. For example, as shown in FIG. 9, the first termination boundary 162 may be replaced with the second termination boundary 164, which has a smaller offset from range boundary 160 than first termination boundary 162. Proceeding onto 410, navigation of vehicle 100 is then confined to within the current termination boundary, which is now the new termination boundary (e.g., second termination boundary 164). Thus, first boundary module 122 is configured to expand navigation of vehicle 100 from within a previous termination boundary (e.g., first termination boundary 162) to within a next termination boundary (e.g., second termination boundary 164).

According to various aspects of the subject technology, method 400 may be implemented to repeatedly reset the error levels associated with the primary positional information and to progressively replace current termination boundaries with next termination boundaries until the last termination boundary includes target 140. Thus, vehicle 100 may be safely navigated to reach target 140. In some aspects, placement of the final gate as close to target 140 as possible may provide the widest possible flight corridor. Depending on mission specific range requirements, method 400 may be implemented in conjunction with a human in the loop gate for added safety (e.g., during a rocket boost portion of the flight of vehicle 100). This human in the loop gate may employ additional traditional flight termination hardware, in addition to and/or in conjunction with the implementation of method 400.

According to certain aspects, when range requirements are less stringent, no additional hardware beyond GPS 108 and IMU 106 may be needed to manage the boundaries of vehicle 100. In some aspects, method 400 may be beneficially implemented for flights less than or equal to 4,000 nautical miles with a broad ocean area impact. However, method 400 may be implemented for flights of any suitable length that may be greater or less than 4,000 nautical miles.

In some aspects, higher reliability of tracking vehicle 100 and managing its boundaries may be desired in certain situations, such as when longer range flights are desired (e.g., greater than 4,000 nautical miles), when the flight corridor of vehicle 100 is close to populated areas, or when other flight risk factors are high. In these situations, two independent boundary management modules may be employed, with each boundary management module obtaining vehicle information of vehicle 100 from a different pair of navigation units.

Figure 10:
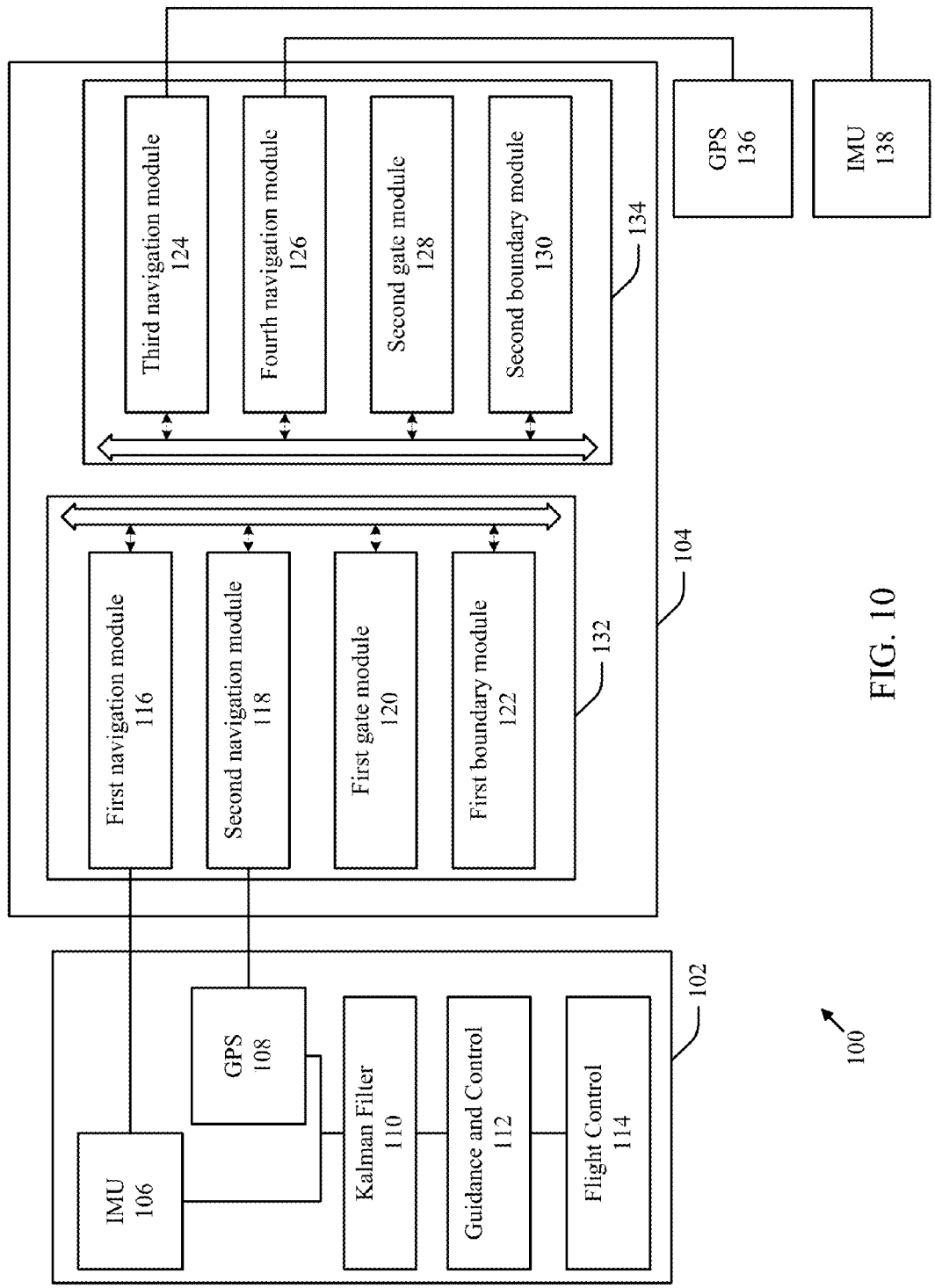
FIG. 10 illustrates a detailed block diagram of a vehicle where a flight safety system comprises two boundary management modules, in accordance with various aspects of the subject technology.

FIG. 10 illustrates a detailed block diagram of vehicle 100 where flight safety system 104 comprises two boundary management modules, in accordance with various aspects of the subject technology. Flight safety system 104 comprises first boundary management module 132 and second boundary management module 134. As discussed above, first boundary management may receive vehicle information from IMU 106 and GPS 108, and implement method 400. Similarly, second boundary management module 134 may receive vehicle information from IMU 138 and GPS 136, and implement method 400 independently from first boundary management module 132. In some aspects, at least one of IMU 138 and GPS 136 may be powered independently from at least one of IMU 106 and GPS 108. In some aspects, GPS 136 and/or IMU 138 may be on-board vehicle 100. However, the subject technology is not limited to such a configuration. Any of the navigation units discussed herein (e.g., IMU 106, GPS 108, IMU 138, GPS 136) may also be located off-board vehicle 100.

Second boundary management module 134 comprises third navigation module 124, fourth navigation module 126, second gate module 128, and second boundary module 130. These modules (e.g., 124, 126, 128, 130) may be in communication with one another. In some aspects, these modules may be implemented in software (e.g., subroutines and code). In some aspects, some or all of these modules may be implemented in hardware (e.g., an ASIC, a FPGA, a PLD, a controller, a state machine, gated logic, discrete hardware components, or any other suitable devices) and/or a combination of both. These modules operate in a similar manner as first navigation module 116, second navigation module 118, first gate module 120, and first boundary module 122 in implementing method 400. In some aspects, second boundary management module 134 may implement method 400 using the same termination boundaries and/or gates as first boundary management module 132. In some aspects, second boundary management module 134 may implement method 400 using different termination boundaries and/or gates from first boundary management module 132.

There is no known implementation of an autonomous solution for a hypersonic vehicle with long range glide capability. Vehicles with much less capability may usually be tracked with off-board sensors and terminated with traditional commanded termination systems. In these short glide ranges, an intractable number of range qualified termination assets along thousands of miles of trajectory may not be needed. Aspects of the subject technology provide an implementation of an autonomous flight safety system that may meet stringent range safety requirements for long range vehicles (e.g., maneuvering reentry or glide vehicles). In some aspects, this implementation can be accomplished with minimum hardware and range assets. Besides reducing cost, aspects of the subject technology make long range flights feasible, as the number of traditional flight termination assets needed for long glide trajectories do not exist. In some aspects, when the subject technology is applied to shorter range flights, the minimization of hardware and range assets increases payload capability and reduces cost.

Targeting System

Figure 11:
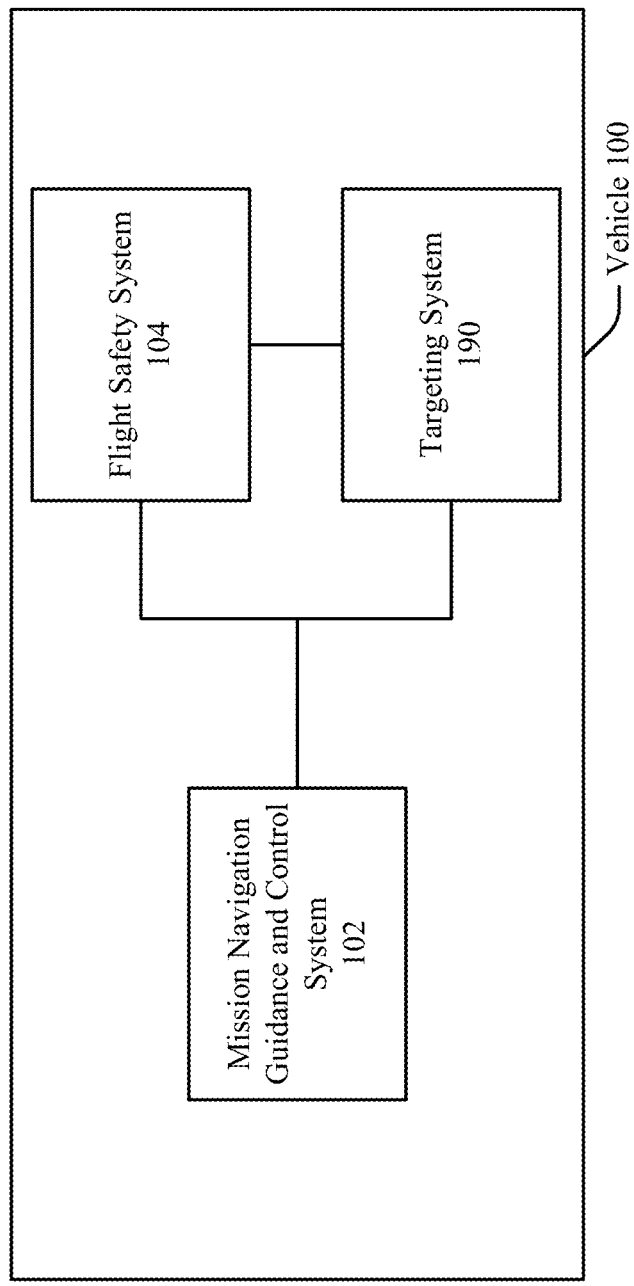
FIG. 11 illustrates a simplified block diagram of a vehicle equipped with a mission navigation guidance and control system and a targeting system, in accordance with various aspects of the subject technology.

FIG. 11 illustrates a simplified block diagram of a vehicle 100 equipped with a mission navigation guidance and control system 102, a flight safety system 104, and a targeting system 190, in accordance with various aspects of the subject technology. The mission navigation guidance and control system 102 may be loaded with a plurality of termination boundaries, a plurality of targets, and a plurality of mission objectives. The mission navigation guidance and control system 102 may be used to guide the vehicle 100 toward a selected target. The flight safety system 104 may be configured to manage the plurality of termination boundaries of the vehicle 100 to ensure that the vehicle 100 does not cross any of the termination boundaries when being guided toward the selected target. The targeting system 190 may be configured to manage the plurality of targets of the vehicle 100. In one aspect, the targeting system 190 may be configured to select the target from the plurality of targets of the vehicle 100 for execution of mission objectives at the selected target. For example, the targeting system 190 may be used for managing the plurality of targets of the vehicle 100 by receiving boundary information from the flight safety system 104, selecting the target based on the received boundary information, and providing the selected target to the mission navigation guidance and control system 102 for execution of the mission objectives at the selected target. In some aspects, the mission navigation guidance and control system 102 may be configured to select and execute a mission objective at the selected target based on the selected target. In some aspects, the plurality of termination boundaries, plurality of targets, and plurality of mission objectives are predetermined prior to vehicle 100 dispatch.

Figure 12:
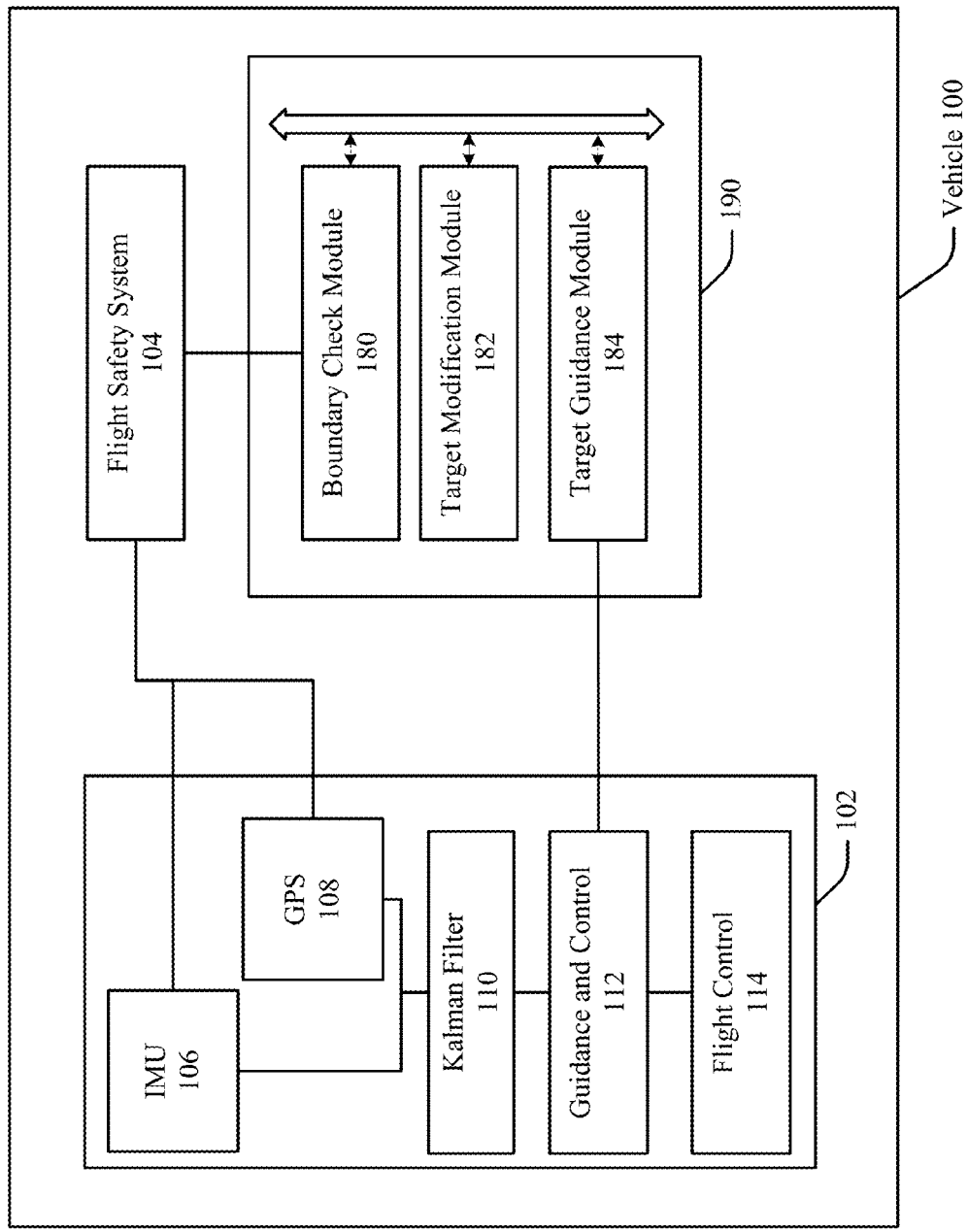
FIG. 12 illustrates a detailed block diagram of a vehicle and targeting system, in accordance with various aspects of the subject technology.

FIG. 12 illustrates a detailed block diagram of the vehicle 100 and the targeting system 190, in accordance with various aspects of the subject technology. The vehicle 100 comprises the mission navigation guidance and control system 102, the flight safety system 104, and the targeting system 190. In some aspects, the mission navigation guidance and control system 102 comprises navigation units 106 and 108, a Kalman filter 110, a guidance and control module 112, and a flight control module 114. The guidance and control module 112 may be loaded with target and mission objective information and may determine how to guide the vehicle 100 toward an intended target. The flight safety system 104 may be configured to confine navigation of the vehicle 100 to within a termination boundary according to method 400, as discussed above. In some aspects, the flight safety system 104 may be configured to select a termination boundary from the plurality of termination boundaries, each one of the plurality of termination boundaries associated with a target of the plurality of targets of the vehicle. In one aspect, the flight safety system 104 may be configured to replace the selected termination boundary with a next termination boundary having a smaller offset. In some aspects, flight safety system 104 may be configured to transmit boundary information comprising the selected termination boundary to the targeting system 190.

The targeting system 190 may comprise a boundary check module 180, a target modification module 182, and a target guidance module 184. These modules (e.g., 180, 182, 184) may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

In some aspects, the boundary check module 180 may be configured to receive boundary information from the flight safety system 104. The boundary information may comprise the selected termination boundary of the plurality of termination boundaries confining navigation of the vehicle. In one aspect, each of the plurality of termination boundaries is associated with a target of the plurality of targets of the vehicle. The target modification module 182 may be configured to select one of the plurality of targets based on the received boundary information. The target guidance module 184 may be configured to provide the selected target to the guidance and control system of the vehicle.

Figure 13:
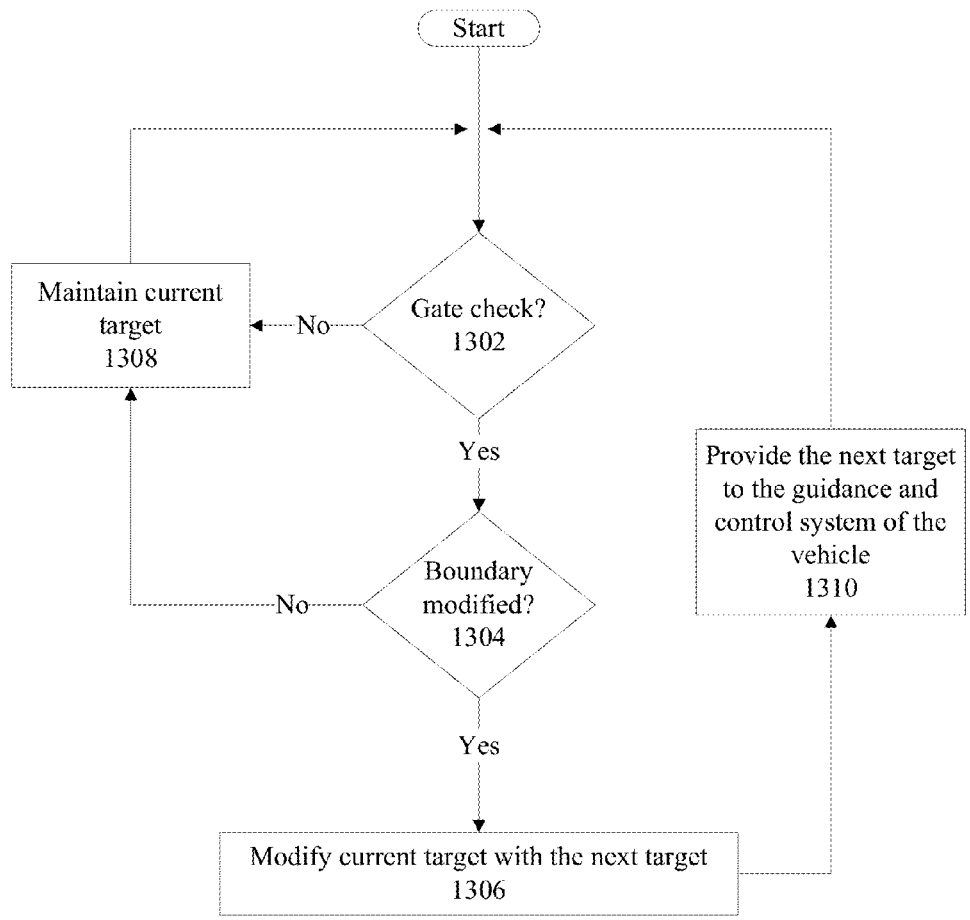
FIG. 13 illustrates an example of a method for managing targets of a vehicle, in accordance with various aspects of the subject technology.

FIG. 13 illustrates an example of a method 1300 for managing targets of the vehicle 100, in accordance with various aspects of the subject technology. Method 1300 may be implemented, for example, by the targeting system 190. According to certain aspects, prior to implementation of method 1300, the vehicle receives a plurality of termination boundaries and plurality of targets of the vehicle 100. In some aspects, each of the plurality of termination boundaries is associated with a target of the plurality of targets. The current termination boundary and current target may be initially set to be a first termination boundary and a first target of the plurality of termination boundaries and targets, respectively (e.g., first termination boundary 162 and first target 210c).

Method 1300 comprises monitoring gate checks (e.g., first gate 220 and second gate 230) throughout the flight of vehicle 100. According to 1302 and 1308, if no gate check is being implemented, then the current target is maintained. According to 1302 and 1304, if a gate check is being implemented, then the boundary check module 180 monitors whether the current termination boundary has been modified by the flight safety system 104. In some aspects, the boundary check module 180 is configured to receive boundary information from the flight safety system 104. The boundary information may comprise information about the current termination boundary including whether the current termination boundary has been replaced with a next termination boundary. According to 1304 and 1308, if the current termination boundary has not been modified, then the current target is maintained.

Method 1300 also comprises selecting one of the plurality of targets based on the received boundary information from the flight safety system 104. According to 1304 and 1306, if the current termination boundary is replaced with a second termination boundary of the plurality of termination boundaries (e.g., second termination boundary 164), then the target modification module 182 is configured to select a second target of the plurality of targets of the vehicle 100 (e.g., second target 210b). According to 1310, after the second target is selected by the target modification module 182, the target guidance module 184 is configured to provide the second target to the mission navigation guidance and control system 102 of the vehicle 100. Accordingly, the second target replaces the first target, now becoming the current target of the vehicle 100. The mission navigation guidance and control system 102 directs the vehicle to the current target for execution of mission objectives at the current target.

Figure 14:
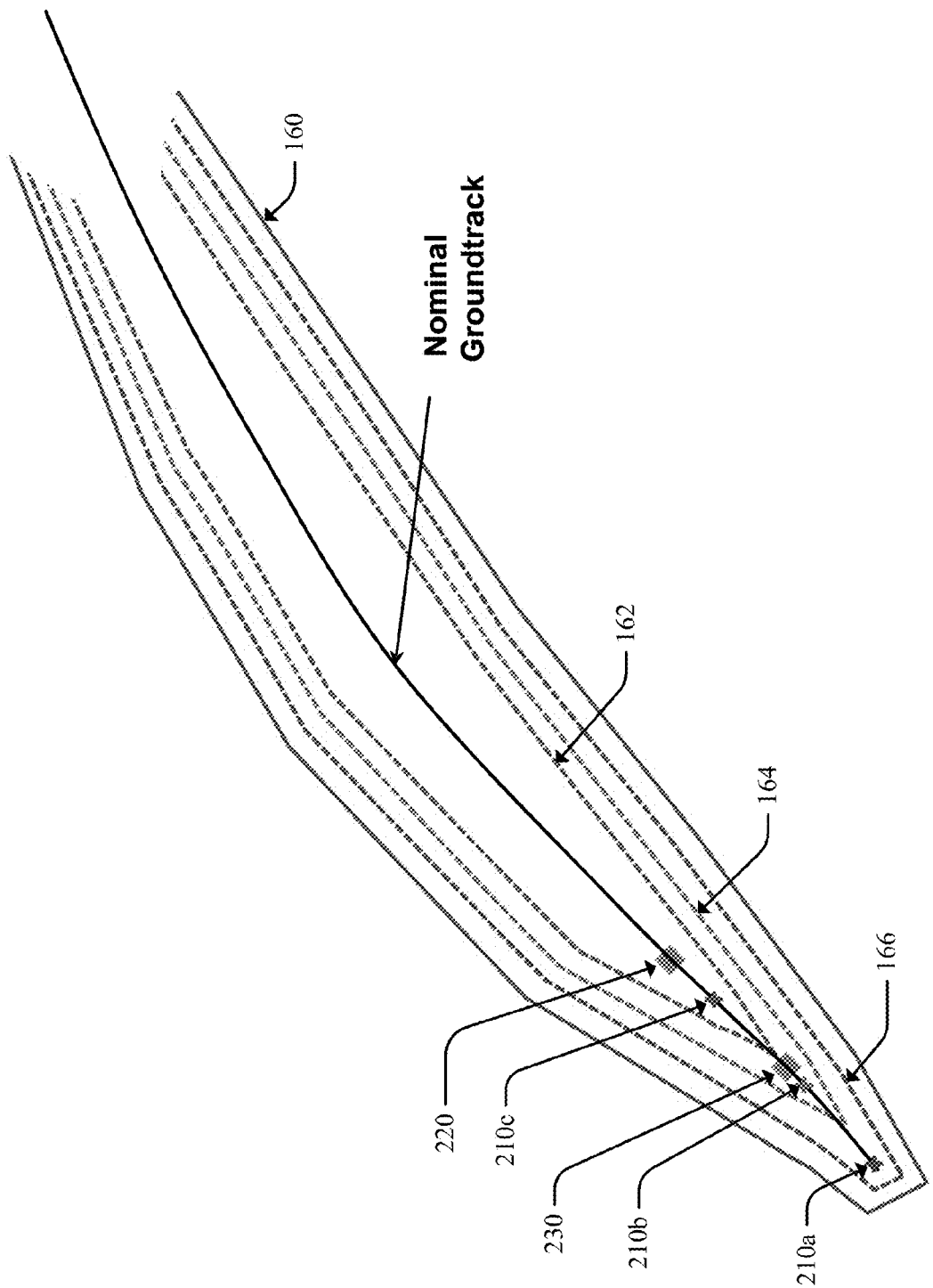
FIG. 14 illustrates an example of the groundtrack of a vehicle and the plurality of targets of the vehicle, in accordance with various aspects of the subject technology.
Figure 15:
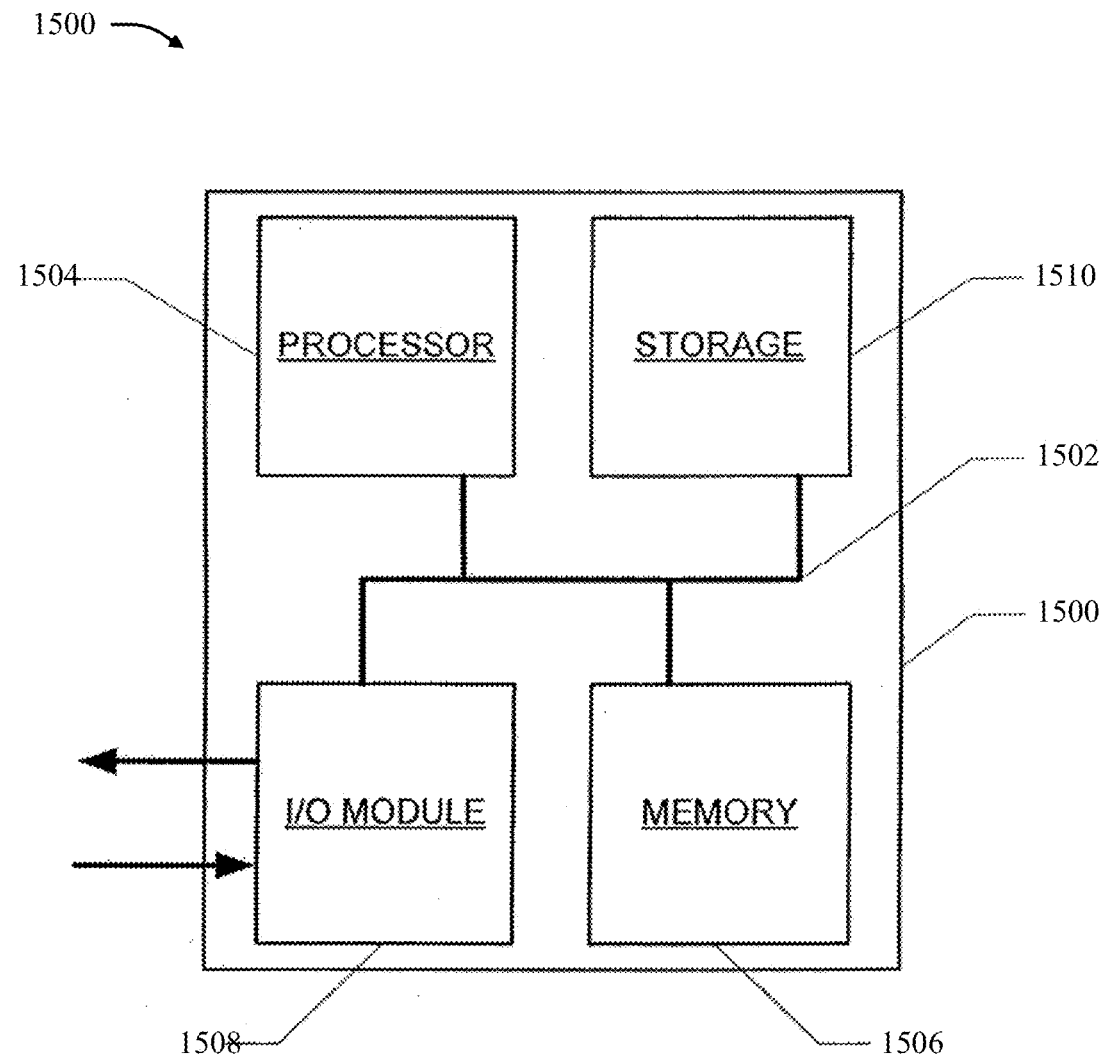
FIG. 15 is a block diagram illustrating components of a controller, in accordance with various aspects of the subject disclosure.

FIG. 14 illustrates an example of the groundtrack of the vehicle 100 and the plurality of targets 210a, 210b, and 210c of the vehicle 100, in accordance with various aspects of the subject technology. In some aspects, prior to launch of the vehicle 100, the vehicle receives the locations of gates 220 and 230, as well as the location of termination boundaries 162, 164, and 166, which are all within a range boundary 160. Each termination boundary 162, 164, and 166 is associated with a target of a plurality of targets 210a, 210b, and 210c of the vehicle. In this example, the first termination boundary 162 is associated with the first target 210c. The second termination boundary 164 is associated with the second target 210b. The third termination boundary 166 is associated with the third target 210a. In some aspects, each target 210c, 210b, and 210a is disposed within its associated termination boundary 162, 164, and 166, respectively. In one aspect, the plurality of termination boundaries and targets are predetermined prior to launch of the vehicle 100.

Prior to launch, the mission navigation guidance and control system 102 is set to the first termination boundary 162 and the first target 210c. As the vehicle travels along the nominal groundtrack, it encounters first gate 220. Referring to FIG. 13, in arriving at the first gate 220, the boundary check module 180 may receive boundary information from the flight control system 104 indicating whether the first termination boundary 162 has been replaced with the second termination boundary 164. If the first termination boundary 162 is maintained, then the first target 210c is maintained and the vehicle executes the mission objectives at the first target 210c. If the boundary information from the flight safety system 104 indicates that the first termination boundary 162 has been replaced with the second termination boundary 164, then the target modification module 182 selects the second target 210b. The target guidance module 184 may then provides the second target 210b to the mission navigation guidance and control system 102. The mission navigation guidance and control system 102 may then direct the vehicle 100 to the second target 210b to execute the mission objectives at the second target 210b.

As the vehicle continues along the nominal groundtrack towards the second target 210b, it may reach the second gate 230. In some aspects, in arriving at the second gate 230 the boundary check module 180 may receive boundary information from the flight control system 104 indicating whether the second termination boundary 164 has been replaced with the third termination boundary 166. If the second termination boundary 164 is maintained, then the second target 210b is maintained and the vehicle executes the mission objectives at the second target 210b. If the boundary information from the flight safety system 104 indicates that the second termination boundary 164 has been replaced with the third termination boundary 166, then the target modification module 182 selects the third target 210a. The target guidance module 184 may then provides the third target 210a to the mission navigation guidance and control system 102. The mission navigation guidance and control system 102 may then direct the vehicle 100 to the third target 210a to execute the mission objectives at the third target 210c.

In one aspect of the subject technology, the mission navigation guidance and control system 102 may be configured to receive the selected target from the targeting system 190. In another aspect, the mission navigation guidance and control system 102 may select one of a plurality of mission objectives based on the selected target. For example, the mission navigation guidance and control system 102 may be loaded with a plurality of mission objectives, each mission objective associated with one of the plurality of targets. Upon receiving a first target of the plurality of targets from the targeting system 190, the mission navigation guidance and control system 102 may select a first mission objective of the plurality of mission objectives, where the first mission objective is associated with the first target. The vehicle 100 is then directed to execute the first mission objective at the first target. In some aspects, one of the plurality of mission objectives is different from another of the plurality of mission objectives. For example, the vehicle 100 may be directed by the mission navigation guidance and control system 102 to deploy a first payload at a first target and deploy a second payload as a second target, where deployment of the first and second payloads yields different results. The vehicle 100 may be configured to execute different mission objectives at different targets. In another aspect, one of the plurality of mission objectives is the same as another of the plurality of mission objectives. For example, the vehicle 100 may be configured to execute similar mission objectives at the different targets. In one aspect each of the plurality of mission objectives are predetermined prior to launch of the vehicle 100.

FIG. 1500 is a block diagram illustrating components of controller 1500, in accordance with various aspects of the subject disclosure. Controller 1500 comprises processor module 1504, storage module 1510, input/output (I/O) module 1508, memory module 1506, and bus 1502. Bus 1502 may be any suitable communication mechanism for communicating information. Processor module 1504, storage module 1510, I/O module 1508, and memory module 1506 are coupled with bus 1502 for communicating information between any of the modules of controller 1500 and/or information between any module of controller 1500 and a device external to controller 1500. For example, information communicated between any of the modules of controller 1500 may include instructions and/or data. In some aspects, bus 1502 may be a universal serial bus. In some aspects, bus 302 may provide Ethernet connectivity.

In some aspects, processor module 1504 may comprise one or more processors, where each processor may perform different functions or execute different instructions and/or processes. For example, one or more processors may execute instructions for implementing method 400, method 1300, one or more processors may execute instructions for managing boundaries of a vehicle being guided toward a target, for managing targets of a vehicle, and one or more processors may execute instructions for input/output functions.

Memory module 1506 may be random access memory ("RAM") or other dynamic storage devices for storing information and instructions to be executed by processor module 1504. Memory module 1506 may also be used for storing temporary variables or other intermediate information during execution of instructions by processor 1504. In some aspects, memory module 1506 may comprise battery-powered static RAM, which stores information without requiring power to maintain the stored information. Storage module 1510 may be a magnetic disk or optical disk and may also store information and instructions. In some aspects, storage module 1510 may comprise hard disk storage or electronic memory storage (e.g., flash memory). In some aspects, memory module 1506 and storage module 1510 are both a machine-readable medium.

Controller 1500 is coupled via I/O module 1508 to a user interface for providing information to and receiving information from an operator of flight safety system 104 and targeting system 190. For example, the user interface may be a cathode ray tube ("CRT") or LCD monitor for displaying information to an operator. The user interface may also include, for example, a keyboard or a mouse coupled to controller 1500 via I/O module 1508 for communicating information and command selections to processor module 1504. The operator of flight safety system 104, for example, may utilize the user interface to input initialization variables (e.g., setting the range boundary, termination boundaries, gates, targets and/or mission objectives). Although the methods described herein may be performed autonomously without a human operator, the user interface may be used by the human operator to initialize these variables prior to the launch of the vehicle.

According to various aspects of the subject disclosure, methods described herein may be executed by controller 1500. Specifically, processor module 1504 executes one or more sequences of instructions contained in memory module 1506 and/or storage module 1510. In one example, instructions may be read into memory module 1506 from another machine-readable medium, such as storage module 1510. In another example, instructions may be read directly into memory module 1506 from I/O module 1508, for example from an operator of flight safety system 104 or targeting system 190 via the user interface. Execution of the sequences of instructions contained in memory module 1506 and/or storage module 1510 causes processor module 1504 to perform methods to manage boundaries of a vehicle being guided toward a target or methods to manage targets of a vehicle. For example, a computational algorithm for managing boundaries of a vehicle being guided toward a target and for managing targets of a vehicle may be stored in memory module 1506 and/or storage module 1510 as one or more sequences of instructions. Information such as the gates, the termination boundaries, the range boundary, the target locations, the primary vehicle information, the secondary vehicle information, the primary positional information, the secondary positional information, the primary impact point, the secondary impact point, the first pass indicator, the first fail indicator, the error levels associated with a particular navigation unit, the termination indicator, the predetermined threshold, the gate information, the boundary information, and/or the mission objectives may be communicated from processor module 1504 to memory module 1506 and/or storage module 1510 via bus 1502 for storage. In some aspects, the information may be communicated from processor module 1504, memory module 1506, and/or storage module 1510 to I/O module 1508 via bus 1502. The information may then be communicated from I/O module 1508 to an operator of flight safety system 104 or targeting system 190 via the user interface.

One or more processors in a multi-processing arrangement may also be employed to execute the sequences of instructions contained in memory module 1506 and/or storage module 1510. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 1504 for execution. Such a medium may take many forms, including, but not limited to, non-volatile media, and volatile media. Non-volatile media include, for example, optical or magnetic disks, such as storage module 1510. Volatile media include dynamic memory, such as memory module 1506. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Figure 16A:
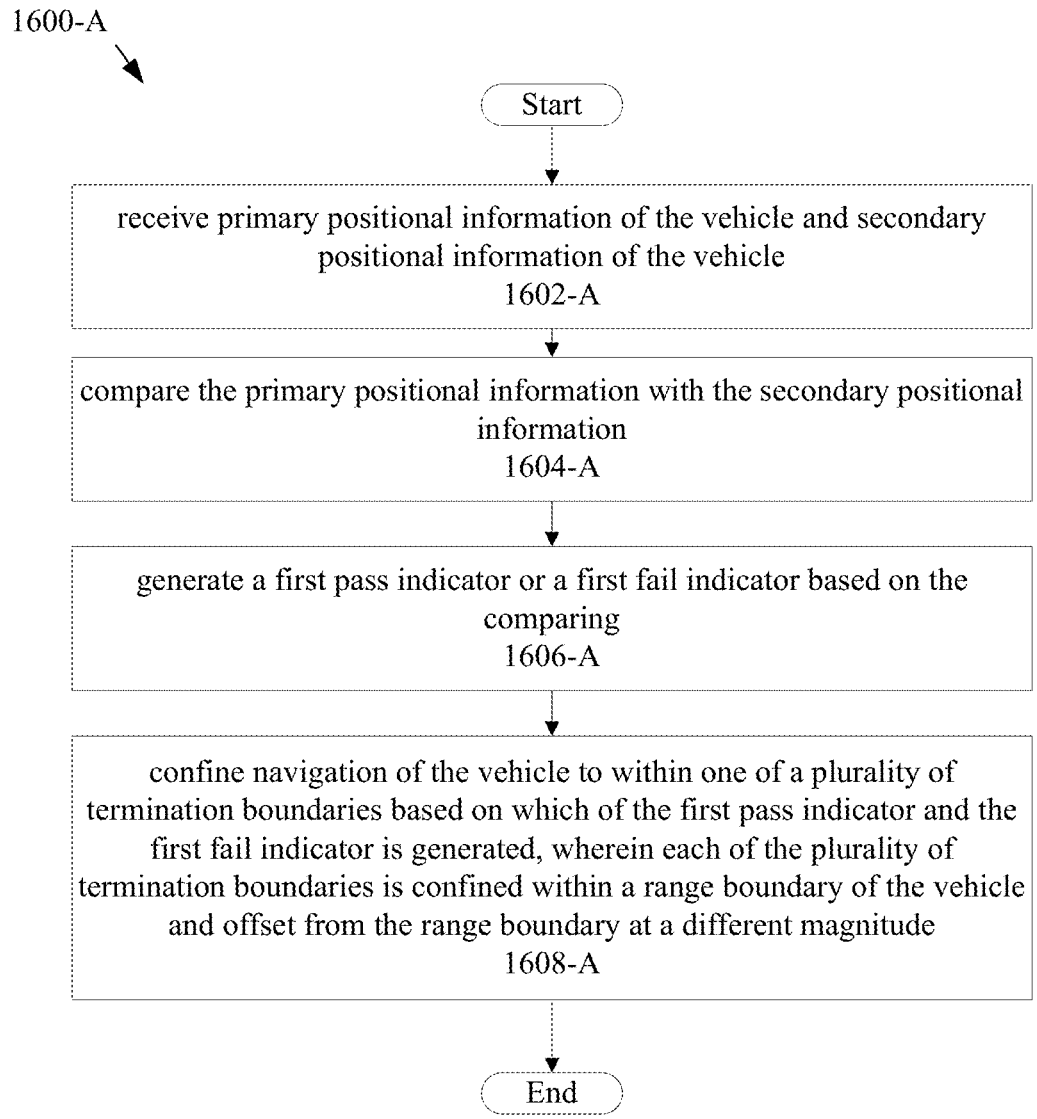
FIG. 16A illustrates an example of a method for managing boundaries of a vehicle being guided toward a target, in accordance with various aspects of the subject technology.

FIG. 16A illustrates an example of method 1600-A for managing boundaries of a vehicle being guided toward a target, in accordance with various aspects of the subject technology. Method 1600-A comprises: receiving primary positional information of the vehicle and secondary positional information of the vehicle (1602-A); comparing the primary positional information with the secondary positional information (1604-A); generating a first pass indicator or a first fail indicator based on the comparing (1606-A); and confining navigation of the vehicle to within one of a plurality of termination boundaries based on which of the first pass indicator and the first fail indicator is generated (1608-A). Each of the plurality of termination boundaries is confined within a range boundary of the vehicle and offset from the range boundary at a different magnitude.

Figure 16B:
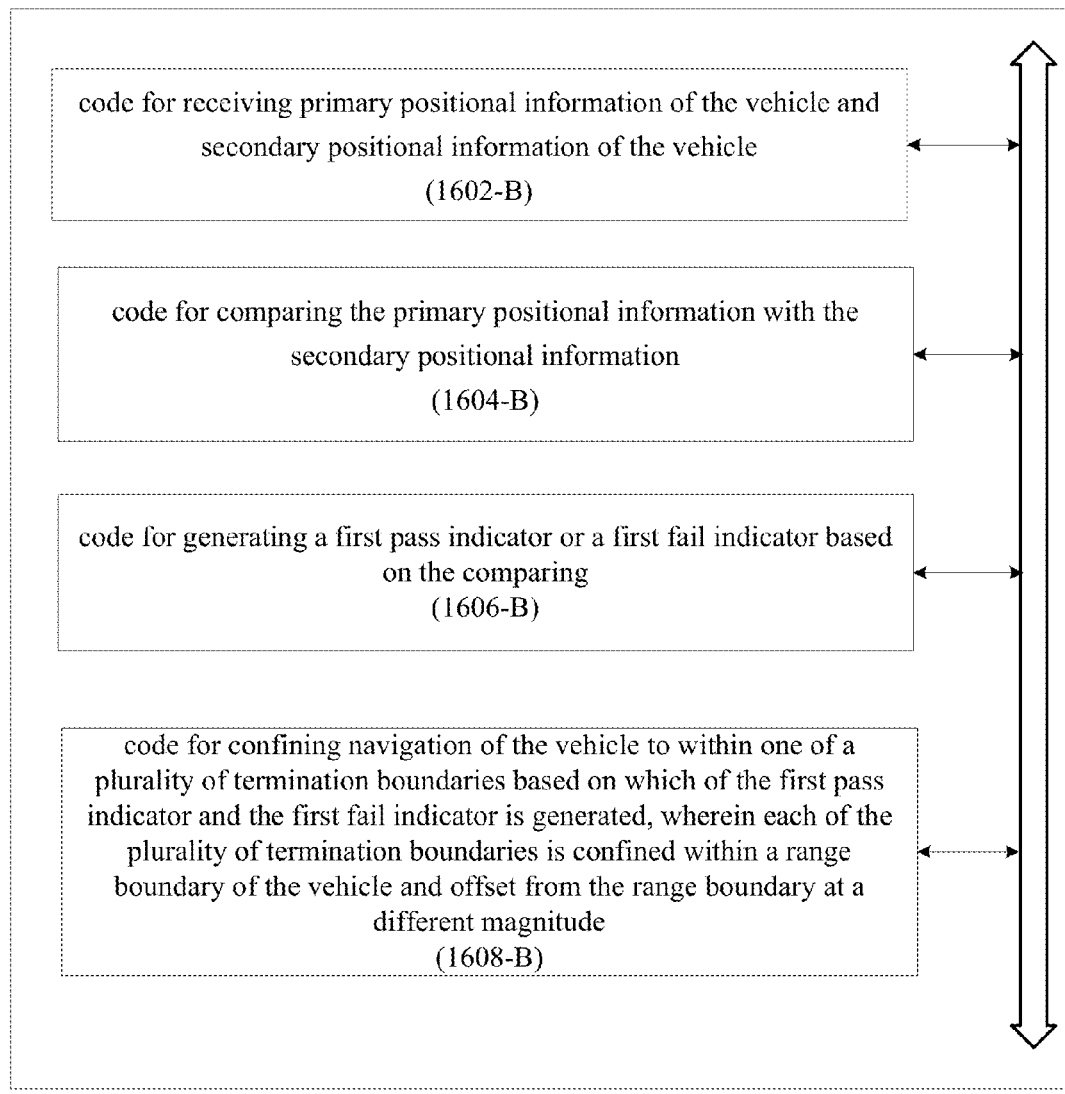
FIG. 16B illustrates an example of a machine-readable storage medium encoded with instructions executable by a processing system to perform a method for managing boundaries of a vehicle being guided toward a target, in accordance with various aspects of the subject technology.

FIG. 16B illustrates an example of machine-readable storage medium 1600-B encoded with instructions executable by a processing system to perform a method for managing boundaries of a vehicle being guided toward a target, in accordance with various aspects of the subject technology. The instructions comprise code for: receiving primary positional information of the vehicle and secondary positional information of the vehicle (1602-B); comparing the primary positional information with the secondary positional information (1604-B); generating a first pass indicator or a first fail indicator based on the comparing (1606-B); and confining navigation of the vehicle to within one of a plurality of termination boundaries based on which of the first pass indicator and the first fail indicator is generated (1608-B). Each of the plurality of termination boundaries is confined within a range boundary of the vehicle and offset from the range boundary at a different magnitude.

Figure 16C:
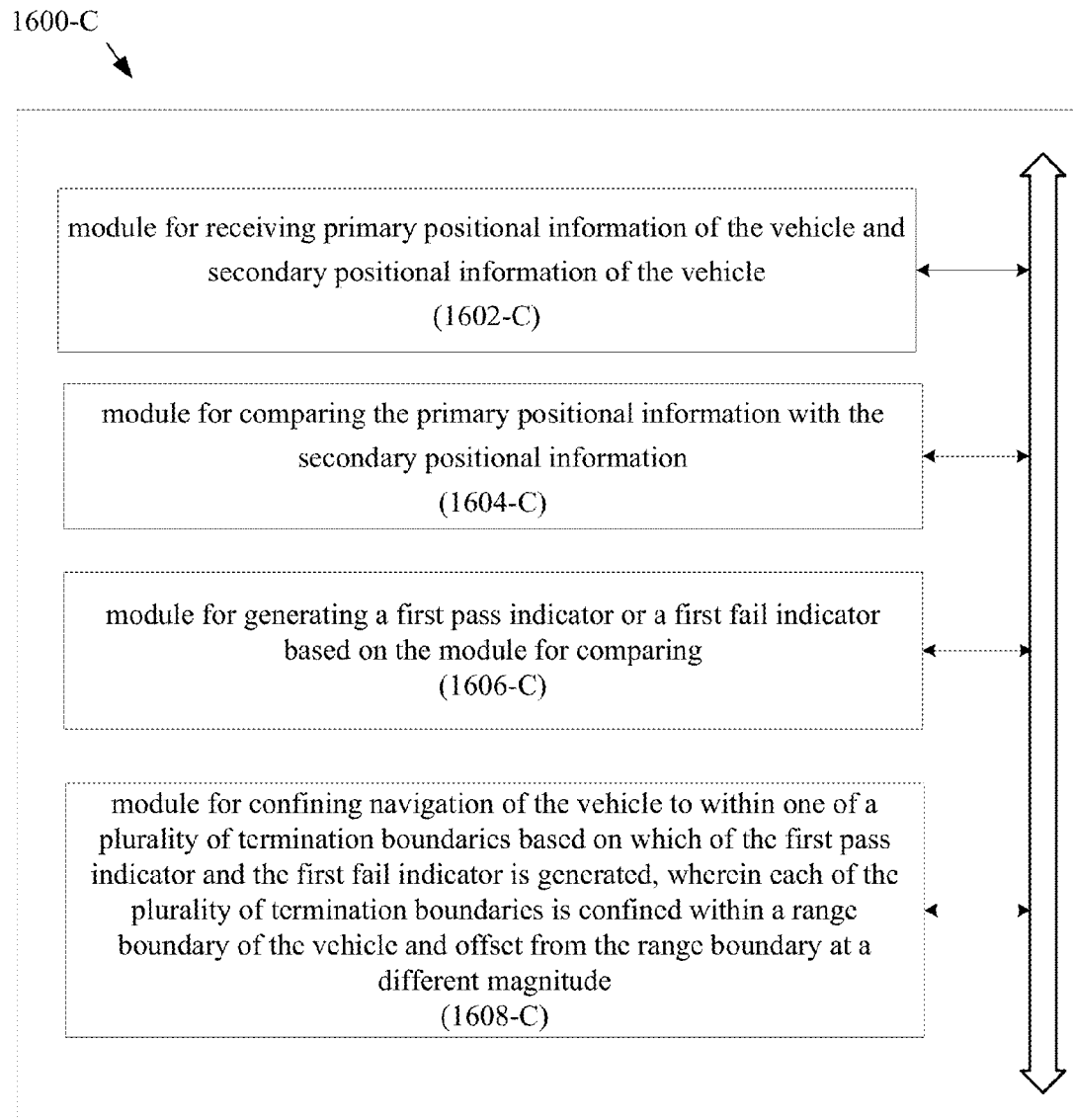
FIG. 16C illustrates an example of an apparatus for managing boundaries of a vehicle being guided toward a target, in accordance with various aspects of the subject technology.

FIG. 16C illustrates an example of apparatus 1600-C for managing boundaries of a vehicle being guided toward a target, in accordance with various aspects of the subject technology. Apparatus 1600-C comprises: module for receiving primary positional information of the vehicle and secondary positional information of the vehicle (1602-C); module for comparing the primary positional information with the secondary positional information (1604-C); module for generating a first pass indicator or a first fail indicator based on the module for comparing (1606-C); and module for confining navigation of the vehicle to within one of a plurality of termination boundaries based on which of the first pass indicator and the first fail indicator is generated (1608-C). Each of the plurality of termination boundaries is confined within a range boundary of the vehicle and offset from the range boundary at a different magnitude.

FIG. 17A illustrates an example of method 1700-A for managing targets of a vehicle, in accordance with various aspects of the subject technology. Method 1700-A comprises: receiving boundary information from a flight safety system, the boundary information comprising a selected termination boundary of a plurality of termination boundaries confining navigation of the vehicle, wherein each of the plurality of termination boundaries is associated with a target of a plurality of targets of the vehicle (1702-A); selecting the target associated with the selected termination boundary (1704-A); and providing the selected target to a guidance and control system of the vehicle (1706-A).

Figure 17B:
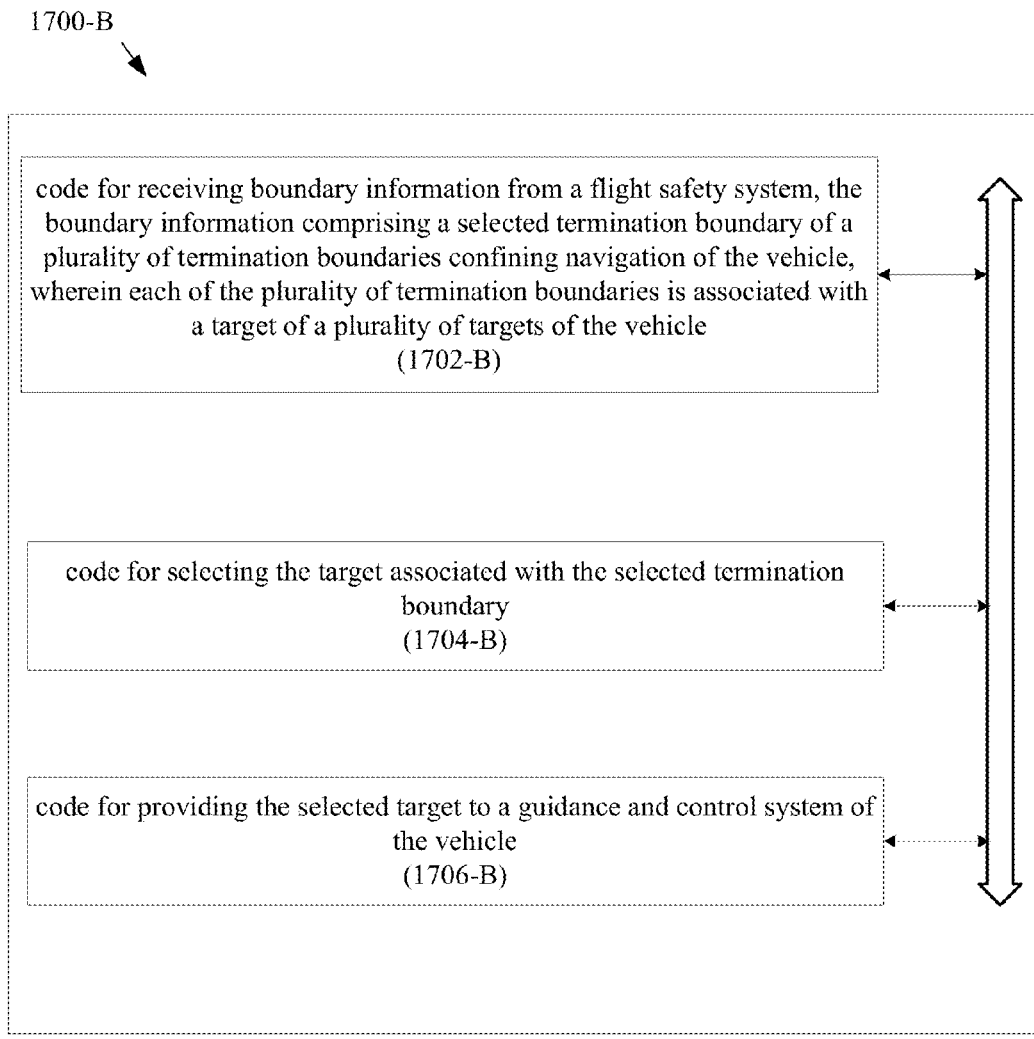
FIG. 17B illustrates an example of a machine-readable storage medium encoded with instructions executable by a processing system to perform a method for managing targets of a vehicle, in accordance with various aspects of the subject technology.

FIG. 17B illustrates an example of machine-readable storage medium 1700-B encoded with instructions executable by a processing system to perform a method for managing targets of a vehicle, in accordance with various aspects of the subject technology. The instructions comprise code for: receiving boundary information from a flight safety system, the boundary information comprising a selected termination boundary of a plurality of termination boundaries confining navigation of the vehicle, wherein each of the plurality of termination boundaries is associated with a target of a plurality of targets of the vehicle (1702-B); selecting the target associated with the selected termination boundary (1704-B); and providing the selected target to a guidance and control system of the vehicle (1706-B)

Figure 17C:
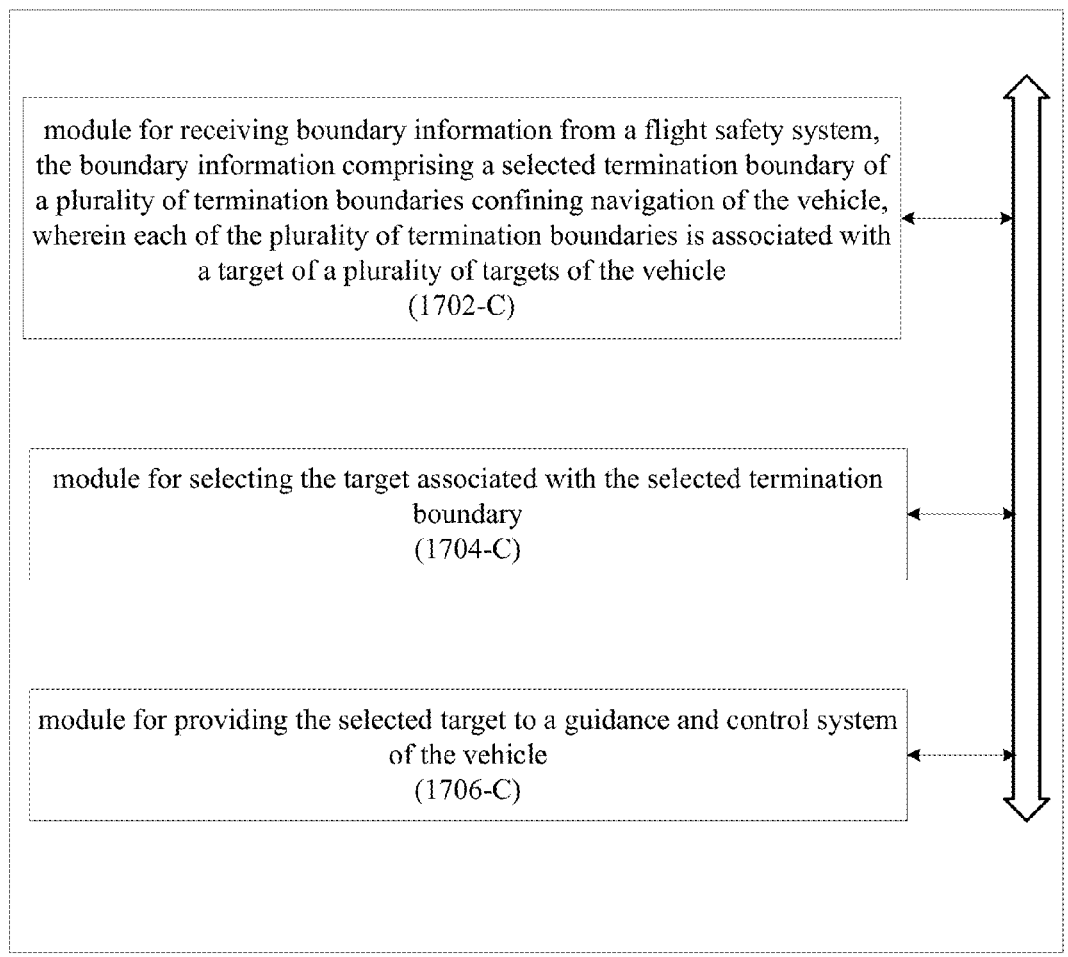
FIG. 17C illustrates an example of an apparatus for managing targets of a vehicle, in accordance with various aspects of the subject technology.

FIG. 17C illustrates an example of apparatus 1700-C for managing targets of a vehicle, in accordance with various aspects of the subject technology. Apparatus 1700-C comprises: module for receiving boundary information from a flight safety system, the boundary information comprising a selected termination boundary of a plurality of termination boundaries confining navigation of the vehicle, wherein each of the plurality of termination boundaries is associated with a target of a plurality of targets of the vehicle (1702-C); module for selecting the target associated with the selected termination boundary (1704-C); and module for providing the selected target to a guidance and control system of the vehicle (1706-C)

According to certain aspects, as used herein, the word "module" refers to logic embodied in hardware or firmware, or to a collection of software instructions, possibly having entry and exit points, written in a programming language, such as, for example C++. A software module may be compiled and linked into an executable program, installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM or EEPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

It is contemplated that the modules may be integrated into a fewer number of modules. One module may also be separated into multiple modules. The described modules may be implemented as hardware, software, firmware or any combination thereof. Additionally, the described modules may reside at different locations connected through a wired or wireless network, or the Internet.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A targeting system for managing targets of a vehicle, the system comprising:
    a boundary check module configured to receive boundary information from a flight safety system and to receive a modification of the selected termination boundary from the flight safety system, the boundary information comprising a selected termination boundary of a plurality of termination boundaries confining navigation of the vehicle, wherein each of the plurality of termination boundaries is associated with a target of a plurality of targets of the vehicle;

a target modification module configured to select the target associated with the selected termination boundary and to modify the target based on the modification of the selected termination boundary; and a target guidance module configured to provide the selected target to a guidance and control system of the vehicle.

2. The targeting system of claim 1, wherein each of the plurality of targets is within an associated termination boundary.

3. The targeting system of claim 1, wherein each of the plurality of termination boundaries are predetermined.

4. The targeting system of claim 1, wherein each of the plurality of targets are predetermined.

5. A vehicle comprising:

a guidance and control system; and a targeting system for managing targets of a vehicle, the system comprising:

a boundary check module configured to receive boundary information from a flight safety system and to receive a modification of the selected termination boundary from the flight safety system, wherein the boundary information comprises a selected termination boundary of a plurality of termination boundaries confining navigation of the vehicle, wherein each of the plurality of termination boundaries is associated with a target of a plurality of targets of the vehicle;

a target modification module configured to select the target associated with the selected termination boundary and to modify the target based on the modification of the selected termination boundary; and a target guidance module configured to provide the selected target to a guidance and control system of the vehicle, wherein the guidance and control system is configured to receive the selected target and select one of a plurality of mission objectives based on the selected target.

6. The vehicle of claim 5, wherein each of the plurality of mission objectives is associated with one of the plurality of targets.

7. The vehicle of claim 5, wherein the one of the plurality of mission objectives is associated with a first of the plurality of targets, and wherein the guidance and control system is configured to select the one of the plurality of mission objectives based on the first of the plurality of targets.

8. The vehicle of claim 5, wherein the one of the plurality of mission objectives is different from another of the plurality of mission objectives.

9. The vehicle of claim 5, wherein the one of the plurality of mission objectives is the same as another of the plurality of mission objectives.

10. The vehicle of claim 5, wherein each of the plurality of mission objectives are predetermined.

11. A method for managing targets of a vehicle, the method comprising:

receiving boundary information from a flight safety system, the boundary information comprising a selected termination boundary of a plurality of termination boundaries confining navigation of the vehicle, wherein each of the plurality of termination boundaries is associated with a target of a plurality of targets of the vehicle;

selecting the target associated with the selected termination boundary;

providing the selected target to a guidance and control system of the vehicle;

receiving a modification of the selected termination boundary from the flight safety system; and modifying the target based on the modification of the selected termination boundary.

12. The method of claim 11, wherein the target is selected based on the modification of the selected termination boundary from the flight safety system.

13. The method of claim 11, wherein each of the plurality of targets is within an associated termination boundary.

14. The method of claim 11, wherein each of the plurality of termination boundaries are predetermined.

15. The method of claim 11, wherein each of the plurality of targets are predetermined.

16. A non-volatile machine-readable storage medium encoded with instructions executable by a processing system to perform a method for managing targets of a vehicle, the instructions comprising code for:

receiving boundary information from a flight safety system, the boundary information comprising a selected termination boundary of a plurality of termination boundaries confining navigation of the vehicle, wherein each of the plurality of termination boundaries is associated with a target of a plurality of targets of the vehicle;

selecting the target associated with the selected termination boundary;

providing the selected target to a guidance and control system of the vehicle;

receiving a modification of the selected termination boundary from the flight safety system; and modifying the target based on the modification of the selected termination boundary.

17. The non-volatile machine-readable storage medium of claim 16, wherein the target is selected based on modification of the selected termination boundary from the flight safety system.

18. The non-volatile machine-readable storage medium of claim 16, wherein each of the plurality of targets is within an associated termination boundary.

19. The non-volatile machine-readable storage medium of claim 16, wherein each of the plurality of termination boundaries are predetermined.

* * * * *